(12) United States Patent
Atungsiri et al.

(10) Patent No.: US 11,412,451 B2
(45) Date of Patent: Aug. 9, 2022

(54) WAKE-UP SIGNAL

(71) Applicant: Sony Corporation, Tokyo (JP)

(72) Inventors: Samuel Asangbeng Atungsiri, Basingstoke (GB); Shin Horng Wong, Basingstoke (GB); Martin Warwick Beale, Basingstoke (GB); Vivek Sharma, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 178 days.

(21) Appl. No.: 16/625,732

(22) PCT Filed: Aug. 9, 2018

(86) PCT No.: PCT/EP2018/071659
§ 371 (c)(1),
(2) Date: Dec. 22, 2019

(87) PCT Pub. No.: WO2019/030337
PCT Pub. Date: Feb. 14, 2019

(65) Prior Publication Data
US 2021/0153120 A1    May 20, 2021

(30) Foreign Application Priority Data
Aug. 11, 2017  (EP) .................... 17186065

(51) Int. Cl.
*H04W 52/02*      (2009.01)
*H04W 4/80*       (2018.01)
(Continued)
(52) U.S. Cl.
CPC ..... *H04W 52/0229* (2013.01); *H04J 13/0022* (2013.01); *H04J 13/0062* (2013.01);
(Continued)

(58) Field of Classification Search
None
See application file for complete search history.

(56) References Cited

U.S. PATENT DOCUMENTS 9,847,900 B2   12/2017   Atungsiri
9,942,076 B2    4/2018   Atungsiri
(Continued)

FOREIGN PATENT DOCUMENTS

WO    2018/202751 A1    11/2018

OTHER PUBLICATIONS

Sequans Communications, "Discussion on wake-up signal for power consumption reduction for feNB-IoT",May 15-19, 2017, 3GPP Draft; R1-1709161, pp. 1-4 (Year: 2017).*

(Continued)

*Primary Examiner* — Adnan Baig
(74) *Attorney, Agent, or Firm* — Xsensus LLP

(57) ABSTRACT

A method comprising receiving, at a first infrastructure equipment of a wireless network, a command from a second infrastructure equipment comprising an indication that a downlink message for a communications device to decode should be transmitted by the first infrastructure equipment and that a wake-up signal should be transmitted by the first infrastructure equipment to the communications device in advance of transmitting the downlink message, and transmitting the wake-up signal to the communications device in advance of transmitting the downlink message to provide the communications device with an indication that the downlink message for the communications device to decode will be transmitted. The wake-up signal comprises a preamble formed by a plurality of Orthogonal Frequency Division Multiplexed, OFDM, symbols, each of the OFDM symbols being modulated with a reference sequence.

19 Claims, 11 Drawing Sheets

(51) Int. Cl.
  H04W 76/11      (2018.01)
  H04J 13/00      (2011.01)
  H04L 27/26      (2006.01)
  H04W 68/00      (2009.01)
(52) U.S. Cl.
  CPC ........... H04L 27/2636 (2013.01); H04W 4/80 (2018.02); H04W 52/0219 (2013.01); H04W 68/005 (2013.01); H04W 76/11 (2018.02)

(56) References Cited

U.S. PATENT DOCUMENTS

| | | | |
|---|---|---|---|
| 9,948,436 B2 | 4/2018 | Atungsiri | |
| 2012/0014477 A1* | 1/2012 | Ko | H04L 25/0226 375/299 |
| 2012/0120905 A1* | 5/2012 | Ko | H04W 72/04 370/329 |
| 2016/0028452 A1* | 1/2016 | Chu | H04L 5/0055 375/267 |
| 2018/0288706 A1* | 10/2018 | Fang | H04L 27/2666 |
| 2019/0313338 A1* | 10/2019 | Wilhelmsson | H04W 52/0229 |
| 2019/0327679 A1* | 10/2019 | Gupta | H04W 76/27 |

OTHER PUBLICATIONS

International Search Report and Written Opinion dated Jan. 8, 2019 for PCT/EP2018/071659 filed on Aug. 9, 2018, 19 pages.
3GPP, "3rd Generation Partnership Project; Technical Specification Group Radio Access Network; Evolved Universal Terrestrial Radio Access (E-UTRA); Medium Access Control (MAC) protocol specification," Release 15, 3GPP TS 36.321 V15.6.0, Jun. 2019, 133 pages.
3GPP, "3rd Generation Partnership Project; Technical Specification Group Radio Access Network; Evolved Universal Terrestrial Radio Access (E-UTRA); User Equipment (UE) procedures in idle mode," Release 15, 3GPP TS 36.304 V15.4.0, Jun. 2019, 55 pages.
Ericsson and Qualcomm, "New WID on Even further enhanced MTC for LTE," 3GPP TSG RAN Meeting No. 75, RP-170732, Dubrovnik, Croatia, Mar. 6-9, 2017, 4 pages.
Ericsson, "Revised WID for Further Enhanced MTC for LTE," 3GPP TSG RAN Meeting No. 73, RP-161464, New Orleans, USA, Sep. 19-22, 2016, 6 pages.
Hambeck, C., et al., "A 2.4 µW Wake-up Receiver for Wireless Sensor Nodes with -71dBm Sensitivity," Proceedings of the IEEE International Symposium on Circuits and Systems (ISCAS), Rio De Janeiro, Brazil, May 15-18, 2011, pp. 534-537.
Holma, H., and Toskala, A., "LTE for UMTS: OFDMA and SC-FDMA Based Radio Access," John Wiley & Sons, Apr. 1, 2009, ISBN 9780470994016, 8 pages.
Huawei and Hisilicon, "Revised work item proposal: Enhancements of NB-IoT," 3GPP TSG RAN Meeting No. 73, RP-161901, New Orleans, USA, Sep. 19-22, 2016, 8 pages.
Huawei et al., "New WID on Further NB-IoT enhancements," 3GPP TSG RAN Meeting No. 75, RP-170852, Dubrovnik, Croatia, Mar. 6-9, 2017, 6 pages.
Seyed Mazloum, N., and Edfors, O., "Performance analysis and energy optimization of wake-up receiver schemes for wireless low-power applications," IEEE Transactions on Wireless Communications, vol. 13, No. 12, Dec. 2014, pp. 1-12.
Sequans Communications, "Discussion on wake-up signal for power consumption reduction for feNB-IoT," 3GPP TSG-RAN WG1 No. 89, R1-1709161, Hangzhou, China, May 15-19, 2017, 4 pages.
Sierra Wireless, "Idle Mode Power Efficiency Reduction," 3GPP TSG RAN WG1 Meeting No. 89, R1-1708311, Hangzhou, P.R. China, May 15-19, 2017, 6 pages.
Sony, "Power consumption evaluation of wake-up signal technique for efeMTC," 3GPP TSG RAN WG1 Meeting No. 89, R1-1708246, Hangzhou, China, , May 15-19, 2017, 7 pages.

* cited by examiner

*WUS preamble detector and decoding sequencer*

*Single symbol pair detector for WUS preamble*

Cascade detector for N-pairs of WUS preamble symbols

Decoding each WUS information part symbol

WAKE-UP SIGNAL

CROSS-REFERENCE TO RELATED APPLICATIONS

The present application is based on PCT filing PCT/EP2018/071659, filed Aug. 9, 2018, which claims priority to EP 17186065.3, filed Aug. 11, 2017, the entire contents of each are incorporated herein by reference.

BACKGROUND

Field of Disclosure

The present disclosure relates to infrastructure equipment and communications devices of wireless communications systems, where infrastructure equipment are configured to transmit Wake-Up Signals (WUSs) in advance of transmitting downlink messages to communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of terminal devices associated with different traffic profiles gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide a method of operating a first infrastructure equipment in a wireless communications system. The wireless communications system comprises the first infrastructure equipment, a second infrastructure equipment and a communications device. The method comprises receiving a command from the second infrastructure equipment comprising an indication that a downlink message for the communications device to decode should be transmitted by the first infrastructure equipment and that a wake-up signal should be transmitted by the first infrastructure equipment to the communications device in advance of transmitting the downlink message, and transmitting the wake-up signal to the communications device in advance of transmitting the downlink message to provide the communications device with an indication that the downlink message for the communications device to decode will be transmitted, wherein the wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols.

Embodiments of the present technique, which further relate to infrastructure equipment, communications devices, methods of operating communications devices and infrastructure equipment and circuitry for communications devices and infrastructure equipment, allow for a Wake-Up Signal preamble sequence design which reduces power usage, is detectable in a non-coherent manner and in poor radio conditions, and is able to carry information.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Advanced Radio Access Technology (4G)

Figure 1:
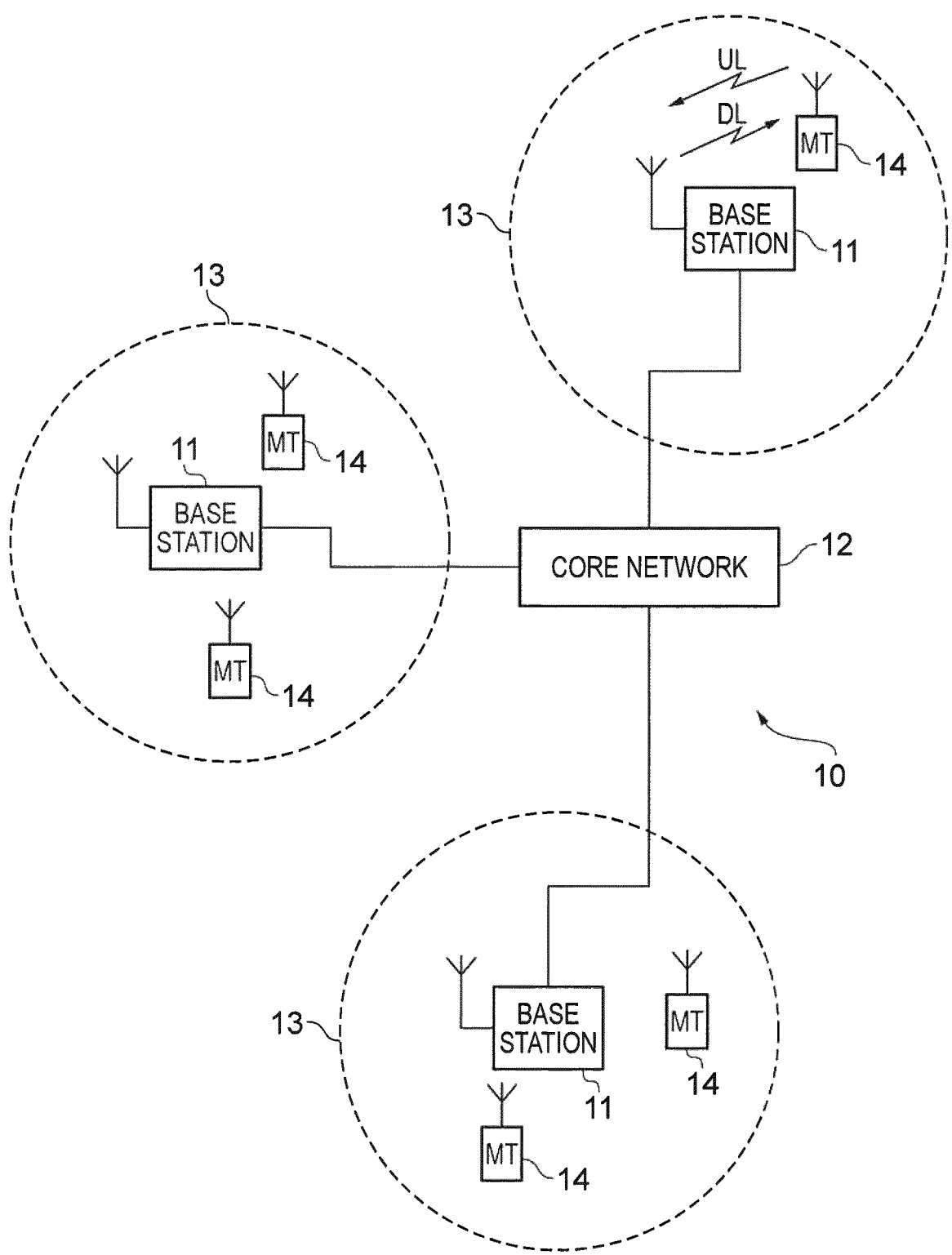
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink. Data is transmitted from terminal devices 14 to the base stations 11 via a radio uplink. The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
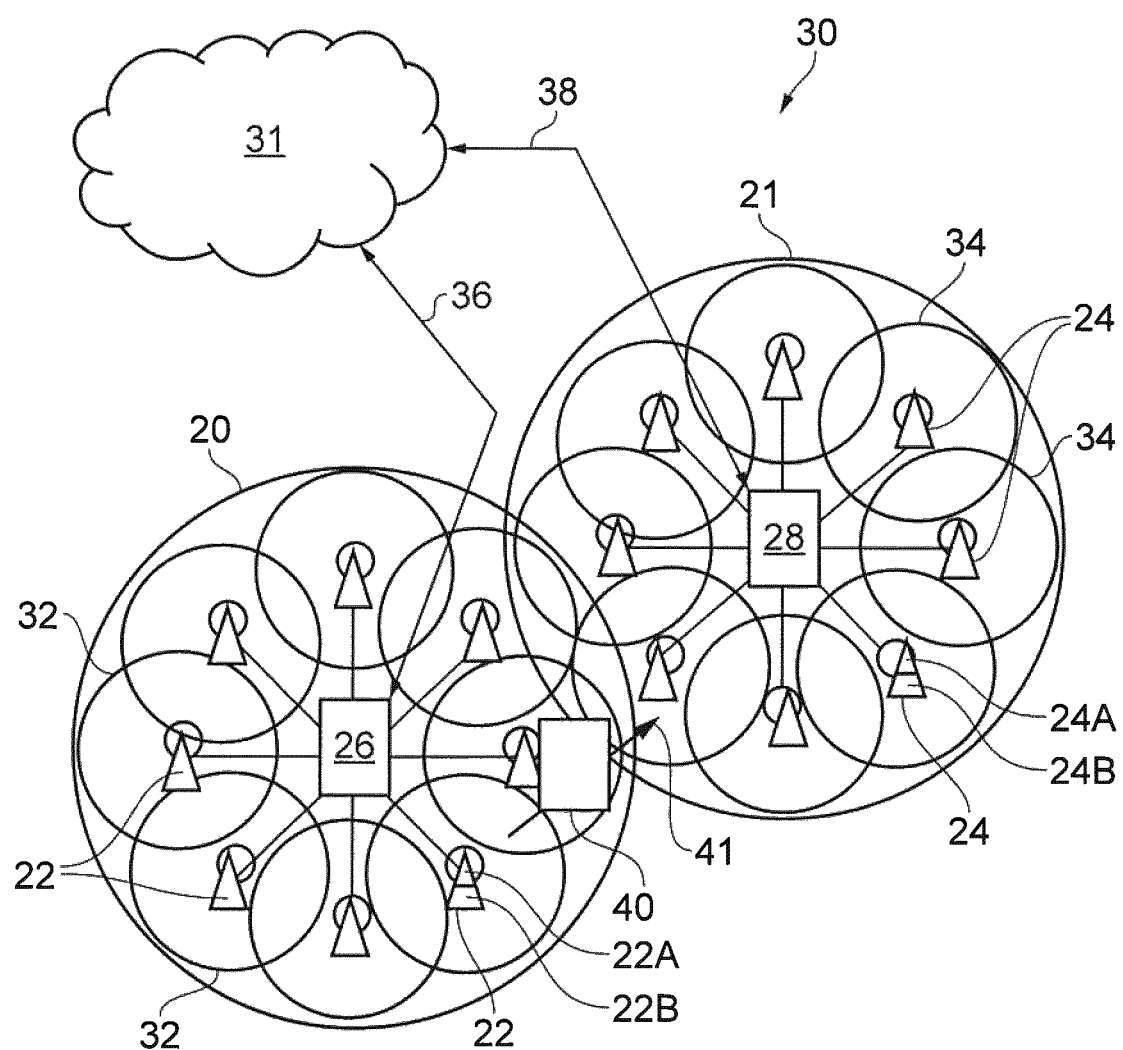
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22a, 22b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating. In such cases, as far as the terminal device is concerned, it simply transmits uplink data to the controlling node 26 and receives downlink data from the controlling node 26 and the terminal device has no awareness of the involvement of the distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

For a terminal device in RRC idle mode the core network is aware that the terminal device is present within the network, but the radio access network (RAN) part (comprising radio network infrastructure equipment such as the base stations 11 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently, and as is well known, when a core network is required to connect to an idle mode terminal device a paging procedure is used.

In a typical currently deployed network, idle mode terminal devices are configured to monitor for paging messages periodically. For terminal devices operating in a discontinuous reception (DRX) mode this occurs when they wake up for their DRX awake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

In a conventional system, a terminal device thus receives and checks the contents of specific sub-frames (paging occasions) in specific frames (paging frames) to look for paging signalling. For example, in accordance with the standards set out in 3GPP TS 36.304 version 14.2.0 Release 14 [6], a Paging Frame (PF) is a downlink radio frame which may contain one or more Paging Occasion(s) (PO), where a Paging Occasion is a sub-frame where there may be P-RNTI transmitted on PDCCH (or equivalent depending channel on implementation, e.g. on MPDCCH for MTC or for NB-IOT on NPDCCH) addressing the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by 3GPP TS 36.321 version 13.5.0 Release 13 [7]). All terminal devices check whether PDCCH at specific PFs/POs configured for their use include P-RNTI or not. If there is a PDSCH allocation addressed to P-RNTI in the relevant subframe, the terminal device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of terminal devices, for example MTC devices, it may be expected the corresponding channel names may be modified. For example, a physical downlink control channel dedicated for MTC devices may be referred to as MPDCCH and a corresponding physical downlink shared channel for MTC devices may be referred to as MPDSCH.

In proposed approaches for eNB-IoT and feMTC in accordance with 3GPP release 14 a terminal device in DRX in idle mode is required to decode PDCCH (or equivalent downlink control channel for the specific implementation at hand) to identify if there are resources scheduled on PDSCH (or equivalent downlink shared channel for the specific implementation at hand) for a paging message during paging occasions in which the terminal device might receive a paging message.

Figure 3:
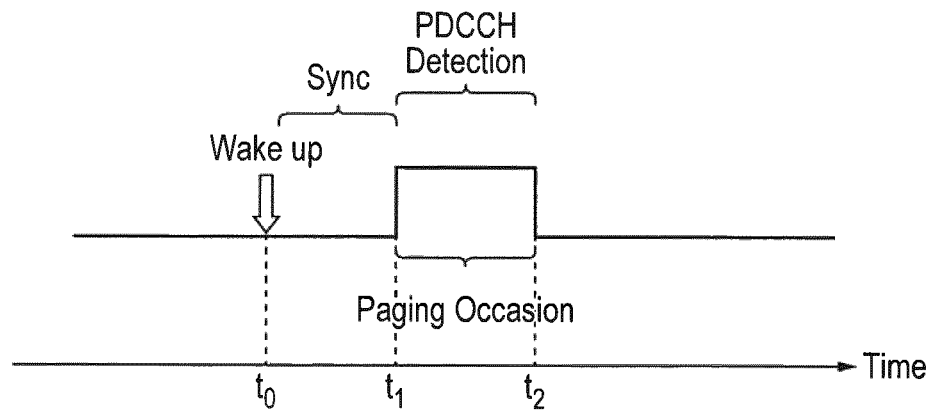
FIGS. 3 and 4 schematically represent time lines associated with paging occasions in wireless telecommunication systems based on known approaches.

FIG. 3 schematically represents a timeline of a paging occasion for a terminal device operating in a known wireless telecommunications system. In the example shown in FIG. 3, one paging occasion is shown and extends from time t1 to t2. As is conventional, paging occasions for a terminal device will typically occur according to a regular repeating schedule having regard to the terminal device's currently configured DRX cycle. Different terminal devices may have different DRX cycle lengths, and so have different times between paging occasions. For a terminal device having a relatively long DRX cycle/time between paging occasions, it is possible the terminal device will to some extent lose synchronisation with the radio network infrastructure equipment of the telecommunications system between paging occasions. In this case it may be helpful for the terminal device to wake up in advance of the paging occasion to allow it to synchronise to the wireless telecommunications system prior to the paging occasion. An example of this is schematically shown in FIG. 3 in which the terminal device wakes up at time t0 so that it can synchronise with the wireless telecommunication system in the period between times t0 and t1 so that it is able to monitor/detect PDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the terminal device may become significantly offset relative to that of the radio network infrastructure).

Once the terminal device has re-synchronised to the network, it will monitor PDCCH to determine if there is a paging message, and if so will go on to decode the PDSCH carrying the paging message in the usual way. If there is no paging message for the terminal device, the terminal device will go back to sleep (low power mode) until the next paging occasion. For certain types of terminal devices, such as MTC devices, it may be expected that paging will occur relatively rarely (e.g. once per day for a smart utility meter), and so in many cases the terminal device may wake up and synchronise to the network to monitor PDCCH by blind decoding for a paging message when in fact there is no paging message for the terminal device. This represents an undesirable "waste" of resources, for example battery power, for the terminal device.

Wake-Up Signal (WUS)

Proposed approaches for eNB-IoT and feMTC in accordance with 3GPP release 15 share several common objectives, and one of these objectives is to reduce power consumption associated with monitoring for paging massages by introducing what is referred to as a wake-up signal (WUS) (e.g. of the type described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [8]). The proposed WUS is carried on a new physical channel and is intended to allow terminal devices to determine whether or not they need to actually decode PDCCH in an upcoming paging occasion. That is to say, whereas in accordance with previously proposed techniques a terminal device is required to decode PDCCH during every paging occasion to determine if there is a paging message, and if so to decode PDSCH to determine if the paging message is addressed to the terminal device, the WUS is instead intended to indicate to the terminal device whether or not the next paging occasion contains a paging message that the terminal device should decode. A WUS is transmitted at a pre-determined/derivable time in advance of a scheduled paging occasion such that a terminal device knows when to seek to receive a WUS and may contain relatively little information so that it can be decoded quickly (as compared to the blind decoding needed for PDCCH). For example, in some implementations the WUS may include a one-bit indication of whether or not there will be a paging message transmitted in the upcoming paging occasion. If the WUS indicates the upcoming paging occasion does include a paging message, any terminal devices for which that paging occasion applies may proceed to decode the paging message as normal to determine if the paging message is addressed to it. If the WUS indicates the upcoming paging occasion does not include any paging message, any terminal device for which that paging occasion applies can determine from this that it does not need to monitor for a paging message during the upcoming paging occasion, and so can, for example, return to a low power mode. In some implementations the WUS may include an identifier for a terminal device that is going to be paged in the paging occasion. This identifier may identify an individual terminal device or may identify a group of terminal devices. The WUS may include multiple identifiers for multiple terminal devices/groups. A terminal device which determines the WUS is associated with an identifier that applies to it may proceed to decode the paging message as normal. Conversely, a terminal device which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 4:
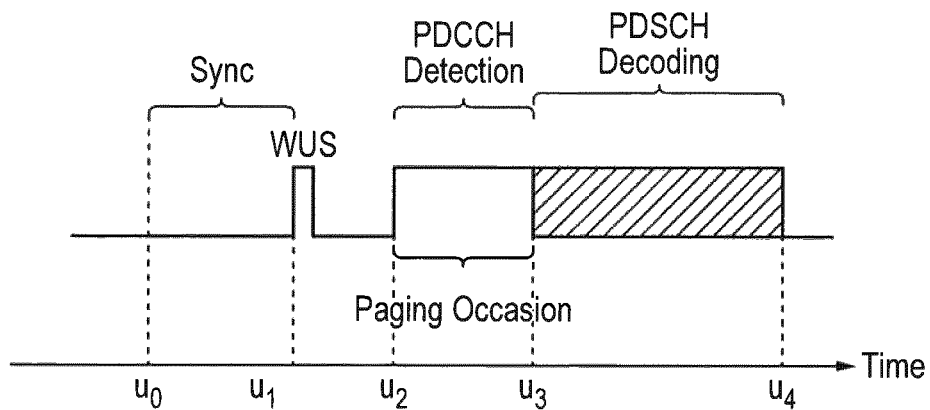

FIG. 4 schematically represents a timeline for a paging occasion for a terminal device operating in a wireless telecommunications system employing a WUS as proposed in association with 3GPP Release 15. In the example shown in FIG. 4, a paging occasion extends from time u2 to u3. As is conventional, the paging occasions will typically occur according to a regular repeating schedule having regard to the terminal device's currently configured DRX cycle.

As schematically indicated in FIG. 4, a WUS is transmitted at a predetermined/derivable time u1 in advance of the paging occasion to indicate there is a PDCCH paging message transmission for a terminal device indicated by an identifier associated with the WUS (the identifier could identify an individual terminal device or a group of terminal devices). The WUS can indicate that the UE should wake up in order to read the paging occasion for at least one of the following reasons:

The UE is potentially paged in the paging occasion
   WUS may carry a single bit signal indicating whether the paging occasion is active or not
The UE is within a group of UEs, where at least one of the UEs in that group is paged at the paging occasion
   WUS indicates a UE group ID
The UE is paged at the paging occasion
   WUS indicates the ID of the UE being paged
System Information (SI) has changed and UEs need to re-read the SI
   WUS indicates that SI has changed If the paging occasion is not scheduled to include a PDCCH paging message transmission for a terminal device, then a WUS identifying that terminal device is not sent. Thus a terminal device may be configured to seek to detect a WUS associated with an identifier for the terminal device in advance of an upcoming paging occasion. If the terminal device detects a WUS associated with an identifier for itself, the terminal device can proceed to fine tune its frequency and timing tracking loops if required and blind detects for a PDCCH between times u2 and u3, followed by decoding of the PDSCH carrying the paging message between time u3 and u4 in the usual way. If, however, the terminal device fails to detect a WUS associated with an identifier for the terminal device, the terminal device may assume there is not going to be a paging message for the terminal device in the upcoming paging occasion, and so may go back to sleep (low power mode) and not decode PDCCH in the paging occasion. As noted above, in some other implementations, the WUS might not include any indication of any specific terminal device(s)/group(s), but may instead simply include an indication of whether or not an upcoming paging occasion includes any paging message. Either way, by using WUS, a terminal device may be expected to consume less energy as it can help avoid unnecessary monitoring/blind decoding of PDCCH (or equivalent depending on the specific implementation at hand). It will be appreciated that WUS can also be used in connected mode when DRX is used.

If a terminal device is configured for a long DRX cycle (i.e. a relatively long time between paging occasions), there may be a significant likelihood the terminal device will lose synchronisation with the radio access network so that it is unable to decode WUS without first synchronising to the radio access network. An example of this is schematically shown in FIG. 4 whereby a terminal device configured for a relatively long DRX cycle may need to wake up at time u0 to allow time for it to synchronise to the radio access network before u1 so that it can detect any WUS signalling. Current proposals for feMTC synchronisation rely on using PSS/SSS in the same way as for LTE. Because PSS/SSS signalling is typically relatively sparse, e.g. only twice per 10 ms radio frame in LTE, a terminal device needing to synchronise to the network using this general synchronisation signalling is required to start doing so a relatively long time in advance of an expected WUS occasion. This is exacerbated for terminal devices relying on coverage enhancement techniques for reliable communications because of poor radio coverage (e.g. because the terminal device is located in a basement), since coverage enhancement techniques typically rely on aggregating repeat transmissions, meaning the terminal device needs to wake up even sooner to receive a sufficient number of the transmissions before an expected WUS occasion. This can mean terminal devices configured for relatively long DRX cycles can consume relatively large amounts of energy at each paging occasion, and would reduce or even offset the power saving benefit from using WUS.

To help address this issue with existing schemes relying on general synchronisation signalling, such as PSS/SSS in an LTE context, which is transmitted relatively infrequently, it has been proposed to transmit additional synchronisation signalling in association with WUS signalling. See, for example, N. S. Mazloum, O. Edfors, "Performance Analysis and Energy Optimization of Wake-Up Receiver Schemes for Wireless Low-Power Applications", IEEE Transaction on Wireless Communications, December 2014 [9]. In particular, it has been proposed in a co-pending European patent application, with application Ser. No. 17/169,577.8 [10] to transmit WUS signalling with synchronisation signalling (e.g. a predetermined/derivable preamble/signature sequence) that can be used by terminal devices to synchronise to the network, for example using conventional correlator techniques.

Figure 5:
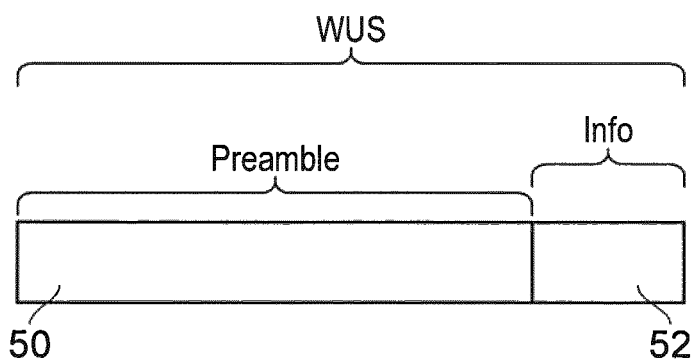
FIG. 5 schematically represents a first example format for wake up signalling (WUS) that may be adapted for use in accordance with certain embodiments of the disclosure.

FIG. 5 schematically represents an example format for wake up signals (WUS) that include a synchronisation preamble (predefined signature sequence) as described in [10]. Thus the WUS represented in FIG. 5 comprises a preamble part 50, which may be of a variable length, and an information ("Info") part 52. The preamble part 50 comprises signalling for terminal devices to use to achieve frequency and/or time synchronisation with the network (i.e. with the radio network infrastructure equipment transmitting the WUS), rather than using the sparsely distributed PSS/SSS (though it should be appreciated that this can still be optionally used in addition to the WUS preamble). The information part 52 comprises an indication of one or more terminal devices to which the WUS applies, e.g. a terminal device identifier and/or an identifier for a group of terminal devices. The terminal device/group identifier(s) may be network allocated identifiers (e.g. radio network temporary identifiers, RNTI) for the terminal device(s), or any other form of suitable identifier, e.g. based on an IMSI for a terminal device.

By providing additional/dedicated synchronisation signalling in association with the WUS, a terminal device may achieve synchronisation with the network using this additional synchronisation signalling transmitted contemporaneously with/around the same time as the WUS, rather than needing to rely on existing general synchronisation signalling, which may be transmitted relatively infrequently in the wireless telecommunications system and so require the terminal device to exit a low power/sleep mode or an extended duration to achieve synchronisation to monitor for WUS signalling.

Figure 6:
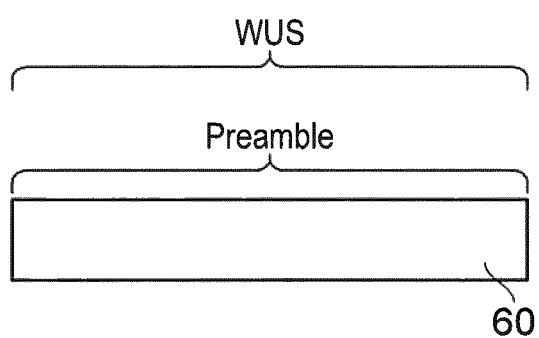
FIG. 6 schematically represents a second example format for wake up signalling (WUS) that may be adapted for use in accordance with certain embodiments of the disclosure.

It will be appreciated there are many modifications that may be made to the approaches set out above in relation to FIG. 5, as described in [10]. For example, the general format for the wake-up signalling may not conform to that shown in FIG. 5, but may have a different format. For example, the wake-up signalling may have a format such as shown in FIG. 6 in which the wake-up signalling comprises a preamble part 60 without a separate information part, and instead, the preamble may itself contain an indication of the identity for the terminal device(s) for which the wake-up signalling indicates a paging message is to be subsequently transmitted.

The WUS's preamble sequence would need to meet the following requirements:
  It needs to be relatively short in time to allow for a quick synchronization and minimize battery power usage;
  It needs to be possible to detect the WUS in a non-coherent manner;
  It needs to be detectable in very poor radio conditions, i.e. SNR=−23 dB, to support coverage enhancement; and
  It needs to be able to carry some information, which is useful for a preamble only type of WUS, as in FIG. 6.

Embodiments of the present technique teach WUS sequence designs which meet these requirements.

Wake-Up Signal Sequences for IoT

Figure 7:
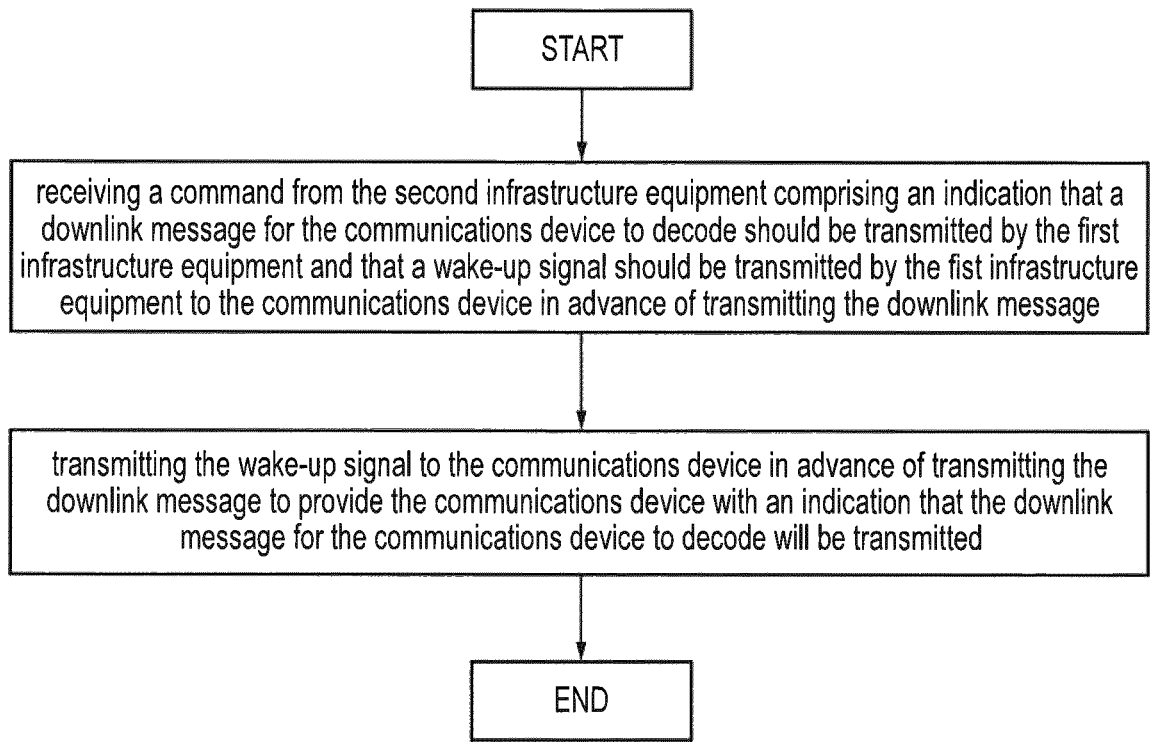
FIG. 7 shows a first flow diagram illustrating a process of communications in a communications system in accordance with embodiments of the present technique.

FIG. 7 shows a flow diagram illustrating a method of operating a first infrastructure equipment in a wireless communications system comprising the first infrastructure equipment, a second infrastructure equipment and a communications device in accordance with embodiments of the present technique. The method comprises in step S72, receiving a command from the second infrastructure equipment comprising an indication that a downlink message for the communications device to decode should be transmitted by the first infrastructure equipment and that a wake-up signal should be transmitted by the first infrastructure equipment to the communications device in advance of transmitting the downlink message. In step S74, the process comprises transmitting the wake-up signal to the communications device in advance of transmitting the downlink message to provide the communications device with an indication that the downlink message for the communications device to decode will be transmitted. The wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols. The process ends in step S76.

The WUS comprises $N_p$ WUS preamble symbols followed by $N_d$ WUS signalling symbols if needed. Each WUS OFDM preamble symbol comprises 3 parts:
  Pseudo-random Sequence (PN)
  Zadoff-Chu (ZC) sequence
  Frequency shift function The dot product of the PN and ZC sequences forms the WUS preamble sequence. Each WUS preamble symbol is constructed as an OFDM symbol in the frequency domain by mapping the elements of the WUS preamble sequence to the designated subcarriers of the OFDM symbol. For each WUS preamble OFDM symbol, the PN sequence is initialized by the Cell ID so that a WUS is linked to the cell and this would also randomize the WUS so that it is orthogonal to the WUS from other cells. The use of ZC sequences would provide good correlation properties at the UE receiver and low PAPR for the transmitted signal. The WUS preamble sequence for preamble symbol m is $X_m(k)$ is:

$$X_m(k)=P_m(k)Z(k)$$

where, $P_m(k)$ is the PN sequence, $Z(k)$ is the Zadoff-Chu sequence for k=0, 1, 2, ... $N_{SC}$−1 where $N_{SC}$ is the number of sub-carriers used for the WUS signal. In other words, in some embodiments of the present technique, the reference sequence comprises a dot product of a Zadoff-Chu sequence and a pseudo-random sequence.

The WUS preamble symbol is then formed by:

$$w_m(k)=x_m(k)e^{-ja_m k}$$

where $Px_m(k)$ is the inverse Fourier transform of $X_m(k)$ and $a_m$ is a frequency shift component for preamble symbol m. In other words, in some embodiments of the present technique, the frequency shifting of the one or more OFDM symbols comprises multiplying an inverse Fourier transform of the reference sequence with a complex exponential of an appropriate phase sequence. Each preamble symbol, is then prefixed by a cyclic prefix of $N_g$ samples. In other words, in some embodiments of the present technique, the method comprises at the first infrastructure equipment prefixing each of the OFDM symbols forming one or both of the preamble of the wake-up signal and the information part of the wake-up signal with a cyclic prefix.

The Applicant's co-pending patent applications published under publications numbers US 2017/026219 A1 [11], US 2017/026220 A1 [12] and US 2017/026221 A1 [13] each disclose bootstrap signals for digital television, where the bootstrap signals comprise OFDM symbols which are combined with reference sequences. The reference sequences are a combination of PN and ZC sequences. However, the disclosures of these co-pending patent applications are not appropriate for describing WUSs, as described by embodiments of the present technique, because there are no prefix and postfix OFDM symbols as are present in the bootstrap signals for digital television. The contents of US 2017/026219 A1 [11], US 2017/026220 A1 [12] and US 2017/026221 A1 [13] are each incorporated herein by reference.

Figure 8:
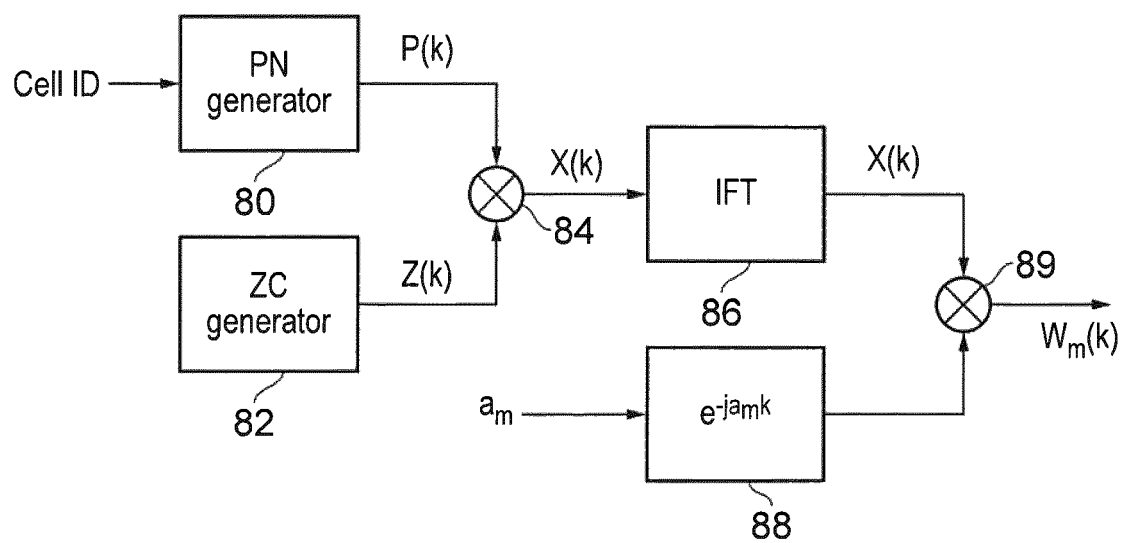
FIG. 8 illustrates a schematic block diagram of a portion of a transmitter architecture of an infrastructure equipment which, in embodiments of the present technique, is configured to carry out the method described by FIG. 7.

FIG. 8 illustrates a schematic block diagram of a portion of a transmitter architecture of an infrastructure equipment which, in embodiments of the present technique, is configured to carry out the method described by FIG. 7. The infrastructure equipment, or circuitry for the infrastructure equipment, is a first infrastructure equipment, and is configured for use in a wireless communications system comprising the first infrastructure equipment, a second infrastructure equipment and a communications device. The first infrastructure equipment comprises controller circuitry and transceiver circuitry which are configured in combination to receive a command from the second infrastructure equipment comprising an indication that a downlink message for the communications device to decode should be transmitted by the first infrastructure equipment and that a wake-up signal should be transmitted by the first infrastructure equipment to the communications device in advance of transmitting the downlink message, and to transmit the wake-up signal to the communications device in advance of transmitting the downlink message to provide the communications device with an indication that the downlink message for the communications device to decode will be transmitted, wherein the wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols.

As shown in FIG. 8, which largely corresponds to the description above relating to the construction of each WUS OFDM preamble symbol in terms of the PN Sequence, ZC sequence (which together form the reference sequence) and the frequency shift function, the portion of the transmitter architecture of the infrastructure equipment comprises both a PN generator 80 and a ZC generator 82. As described above, the PN generator 80 is initialised by the Cell ID of the cell operated by the infrastructure equipment, and the output of the PN generator 80 is multiplied 84 by (or more specifically, the dot product is taken with) the output of the ZC generator 82. An inverse Fourier transform 86 is then taken of the output of the multiplier 84, and the result of this is then multiplied 89 by the function $e^{-ja_m k}$, which represents a frequency shift with a frequency shift component of $a_m$ for preamble symbol m. The output of the multiplier 89 is the mth WUS preamble symbol.

In some embodiments of the present technique, when the symbol index m is odd, $a_m=0$, so that the frequency shift $e^{-ja_m k}=1$ whilst for zero or even m $a_m=2\pi nS$ where n is an integer and S is the subcarrier spacing (i.e. 15 kHz in efeMTC). Thus for the WUS preamble, the OFDM symbols alternate between symbols with a frequency shift and those without as:

$$w_m(k)=x_m(k)e^{-ja_m k}$$

$$w_{m+1}(k)=x_{m+1}(k)$$

$$w_{m+2}(k)=x_{m+2}(k)e^{-ja_{m+2} k}$$

In other words, each of the OFDM symbols forming the preamble of the wake-up signal are associated with a unique symbol index, and wherein the OFDM symbols which are transmitted having been shifted in frequency with respect to the frequency of the successive other OFDM symbols are those with an even symbol index.

In some embodiments of the present technique, the frequency shift components $a_p=a_q$ for p≠q so the frequency shift for all frequency-shifted symbols is the same. In other words, the OFDM symbols which are transmitted having been shifted in frequency with respect to the frequency of the successive other OFDM symbols are each transmitted having been shifted in frequency by a same amount. In alternative arrangements, the OFDM symbols which are transmitted having been shifted in frequency with respect to the frequency of the successive other OFDM symbols are each transmitted having been shifted in frequency by an amount dependent on their symbol index.

Figure 9:
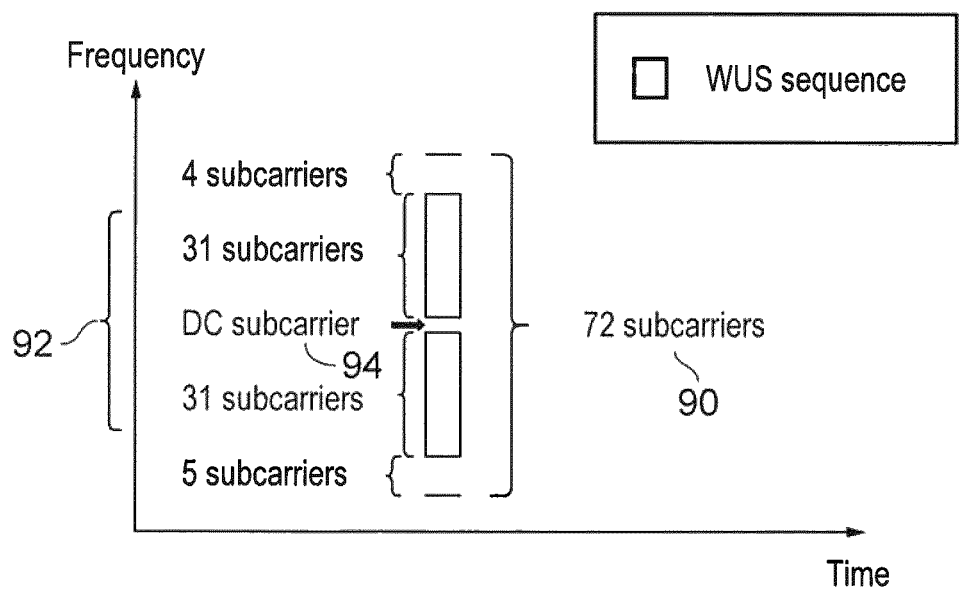
FIG. 9 demonstrates an example of WUS allocation in a narrow band channel in accordance with embodiments of the present technique.

In some embodiments of the present technique, the WUS in a narrowband 90 (72 subcarriers) occupies 63 subcarriers 92 as shown in FIG. 9. In other words, the wake-up signal is transmitted in a substantially central portion of a narrow band channel of a wireless access interface of the wireless communications system. In such arrangements, the wake-up signal occupies sixty three subcarriers of the narrow band channel, wherein the narrow band channel is formed in a first bandwidth smaller than and contained within a host bandwidth in which the first infrastructure equipment is able to transmit and receive signals. In such embodiments of the present technique, an arrangement includes where $N_{SC}=63$ and $P(31)=0$ so that the central sub-carrier 94 of the WUS preamble OFDM symbol would be modulated with zero. In other words, the method comprises at the first infrastructure equipment modulating the OFDM symbol carried by the central sub-carrier of the portion of the narrow band channel in which the wake-up signal is transmitted with zero.

Figure 10:
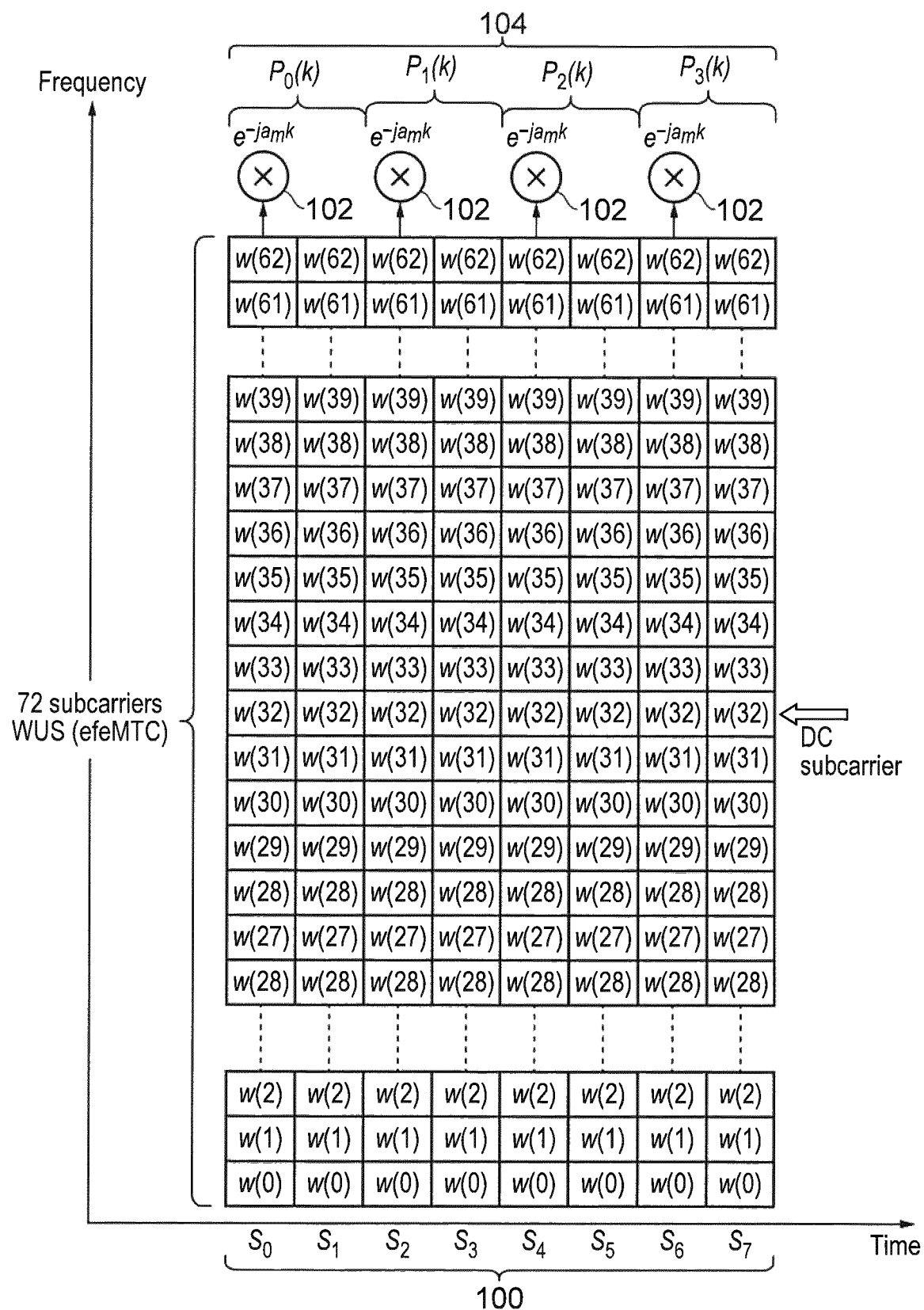
FIG. 10 illustrates an example implementation of a WUS preamble sequence which matches repetition length in time in accordance with embodiments of the present technique.

The length of the sequence may be fixed in frequency domain (e.g. at 63) but the length of the WUS preamble i.e. the number of WUS preamble symbols ($N_p$) in time can be variable. An example is shown in FIG. 10, where the number of WUS preamble symbols 100 $N_p$=8. In [10], it was proposed that the WUS length can be based on the length of the DRX cycle and/or the coverage level.

As described above in relation to embodiments of the present technique, the even symbol ($s_0$, $s_2$, $s_4$ & $s_6$) of the WUS preamble are multiplied 102 by a frequency shift $e^{-ja_mk}$, as shown in FIG. 10, where symbol $s_0$, $s_2$, $s_4$ & $s_6$ are frequency shifted. Hence the UE knows the boundary of pairs 104 of symbols 100. In order for the UE to determine the boundary of the WUS sequence (both the start and the end), some embodiments of the present technique comprise the PN sequence $P_m(k)$. used for each pair of preamble WUS symbols being different. This means that for symbols 2m and 2m+1, the $P_{2m}(k)=P_{2m+1}(k)$.

In a first arrangement of these embodiments of the present technique, this (extending the P(k) length) is achieved by initializing the PN function for every pair of repetitions. For example, in FIG. 10, the P(k) for symbol pair {$s_0$, $s_1$}, {$s_2$, $s_3$}, {$s_4$, $s_5$} and {$s_6$, $s_7$} uses PN sequence $P_0(k)$, $P_1(k)$, $P_2(k)$ and $P_3(k)$ respectively which are initialized by different values based on their pair number. In other words, the method comprises at the first infrastructure equipment, determining that the plurality of OFDM symbols form a plurality of pairs of OFDM symbols, each pair of OFDM symbols being formed of one of the OFDM symbols which are transmitted having been shifted in frequency with respect to the frequency of the successive other OFDM symbols and the respective successive other OFDM symbol, and transmitting the same unique reference sequence in both OFDM symbols of each pair of OFDM symbols. It should be appreciated that this initialization value can also be a function of the Cell ID (as per previous embodiment) and the pair number. In embodiments of the present technique, each of the OFDM symbols forming the preamble of the wake-up signal are associated with a unique symbol index, and each pair of OFDM symbols is associated with a unique pair index, and wherein the unique reference sequence of each pair of OFDM symbols is dependent on one or both of the symbol index and the pair index.

In a second arrangement of these embodiments of the present technique, this (extending the P(k) length) is achieved by initializing a larger PN sequence generator using only the cell ID and then using unique $N_{SC}$ length segments of the resulting long PN sequence of length $N_p*N_{SC}/2$ for successive pairs of the WUS preamble symbols. In other words, the unique reference sequence of each pair of OFDM symbols is a segment of a long reference sequence, a length of which is determined as the product of a total number of the plurality of the OFDM symbols of the preamble of the wake-up signal and a number of subcarriers per OFDM symbol that are modulated with the reference sequence, wherein the segment of the long reference sequence is dependent on the symbol index.

One of the requirements for WUS is to be able to indicate information to the UE. One such piece of information is a UE-group ID such that a WUS can address specific groups of UEs (ideally the WUS addresses a single UE). In some embodiments of the present technique, different groups of UEs are differentiated by different root sequences of the Zadoff-Chu component. For example for the Zadoff-Chu sequence:

$$Z(k) = e^{-j\frac{r\pi k(k+1)}{N_{ZC}}}$$

where, $N_{ZC}=N_{SC}$ is an odd integer (typically a prime number) and r (mutually prime with $N_{ZC}$) is the root of the ZC sequence. Different values of r would give different Zadoff-Chu sequences, i.e. a UE (or group of UEs) is assigned to one of the set of root sequences which can be configured by the network via RRC signaling. In other words, the OFDM symbols are transmitted with a reference sequence dependent on a unique group identifier associated with the communications device, or the OFDM symbols are transmitted with a reference sequence dependent on a unique identifier of a group of communications devices comprising at least the communications device.

In some embodiments of the present technique, the UE group is indicated in the frequency shift function, i.e. the variable n in the frequency shift function (i.e. the n in $e^{-j(2\pi nS)k}$). In other words, the OFDM symbols which are transmitted having been shifted in frequency with respect to the frequency of the successive other OFDM symbols are each transmitted having been shifted in frequency by an amount dependent on a unique identifier of a group of communications devices comprising at least the communications device.

In some embodiments of the present technique, the UE is grouped under two levels where the first level is indicated by the ZC root and the second level is indicated by the variable n in the frequency shift function. This can be beneficial for example if the eNB wishes to wake up a fraction of the group. In other words, the OFDM symbols are transmitted with a reference sequence dependent on a first unique identifier of a first group of communications devices comprising at least the communications device and wherein the OFDM symbols which are transmitted having been shifted in frequency with respect to the frequency of the successive other OFDM symbols are each transmitted having been shifted in frequency by an amount dependent on a second unique identifier of a second group of communications devices comprising at least the communications device.

In some embodiments of the present technique, a different Zadoff-Chu root is used for UEs in a different coverage level. In other words, the reference sequence with which the OFDM symbols are transmitted is dependent on a coverage level of the communications device.

In some embodiments of the present technique, a different n value of the frequency shift component is used to indicate different coverage level. In other words, the OFDM symbols which are transmitted having been shifted in frequency with respect to the frequency of the successive other OFDM symbols are each transmitted having been shifted in frequency by an amount dependent on a coverage level of the communications device.

In some embodiments of the present technique, the Zadoff-Chu sequence root indicates a specific group of UEs whilst the n value in the frequency shift component is used to indicate the coverage level. Here, the UE will use a different n value dependent upon its RSRP measurement (i.e. the UE will determine its coverage level based on an RSRP measurement and choose the value of n to use for WUS decoding). This allows the eNB to address different UEs at different times, for example the eNB can wake up the UEs at the deepest coverage that require the most resources for random access and then move on to the next coverage level.

In some embodiments of the present technique, one of the Zadoff-Chu sequence roots indicates an SI change. In other words, the reference sequence with which the OFDM symbols are transmitted is dependent on whether system information has changed since a previous downlink transmission was transmitted by the first infrastructure equipment to the communications device.

In some embodiments of the present technique, a value of n in the frequency shift function indicates an SI change. In other words, the OFDM symbols which are transmitted having been shifted in frequency with respect to the frequency of the successive other OFDM symbols are each transmitted having been shifted in frequency by an amount dependent on whether system information has changed since a previous downlink transmission was transmitted by the first infrastructure equipment to the communications device.

In some embodiments of the present technique, the Zadoff-Chu sequence root indicates an SI change and the n value in the frequency shift function further indicates which SI has changed. This embodiment recognizes that the UE would save time and power reading only the targeted SI rather than re-reading all the SIs. Furthermore, some SI are not relevant to the UE's function and hence the UE can completely avoid waking up to read any SI (if it only decodes WUS that are applicable to the SIs that are relevant to it). In other words, the reference sequence with which the OFDM symbols are transmitted is dependent on whether system information has changed since a previous downlink transmission was transmitted by the first infrastructure equipment to the communications device, and the OFDM symbols which are transmitted having been shifted in frequency with respect to the frequency of the successive other OFDM symbols are each transmitted having been shifted in frequency by an amount dependent on which of a plurality of portions of the system information has changed since the previous downlink transmission was transmitted by the first infrastructure equipment to the communications device.

In some embodiments of the present technique the different Zadoff-Chu sequence roots indicate the UE ID group whilst the n value in the frequency shift function indicates whether the UE should wake up or go to sleep. It has been noted that UE may fail to detect the WUS and hence miss out on a paging. To improve the reliability (i.e. reduce missed detection), it was proposed in [14] that the WUS is always transmitted, but would indicate whether the UE should go back to sleep or wake up to receive paging. Hence this embodiment allows such an implementation. In other words, the OFDM symbols are transmitted with a reference sequence dependent on a unique identifier of the communications device, or the OFDM symbols are transmitted with a reference sequence dependent on a unique identifier of a group of communications devices comprising at least the communications device, and the OFDM symbols which are transmitted having been shifted in frequency with respect to the frequency of the successive other OFDM symbols are each transmitted having been shifted in frequency by an amount dependent on a determination by the first infrastructure equipment as to whether the communications device should enter a connected state or whether the communications device should enter a discontinuous reception state.

In some embodiments of the present technique, the PN sequence of the P(k) function is initialized based on a function of the tracking area. In other words, the reference sequence with which the OFDM symbols are transmitted is dependent on a tracking area of the communications device, the tracking area being a group comprising the first infrastructure equipment and one or more other infrastructure equipment from which the communications device is able to receive paging signals. This is useful if a common WUS is used within a tracking area. As is well understood by those skilled in the art, the tracking area is a group of cells/eNBs where the UE is located and/or in close proximity to, and typically the eNBs in a tracking area would page the UE belonging to this tracking area (since in the idle mode, the network knows the UE's location within a tracking area). Alternatively, in some embodiments of the present technique, the Zadoff-Chu sequence root indicates the tracking area.

In some embodiments of the present technique, the value of n in the frequency shift function indicates the tracking area.

It should be noted that typically details of a page is transparent to the eNB and is known to the Mobility Management Entity (MME) of the network. Hence for cases where the MME page targets a specific group of UEs or specific UE, the MME needs to inform the eNB. Therefore, in some embodiments of the present technique, the MME signals to the eNB which WUS to use for an upcoming page. In such embodiments of the present technique, an alternative arrangement includes signalling by the MME to the eNB the UE group or UE ID that the eNB needs to page and the eNB decides on the WUS sequence to use. In other words, the wake-up signal is selected from a plurality of wake-up signals.

Figure 11:
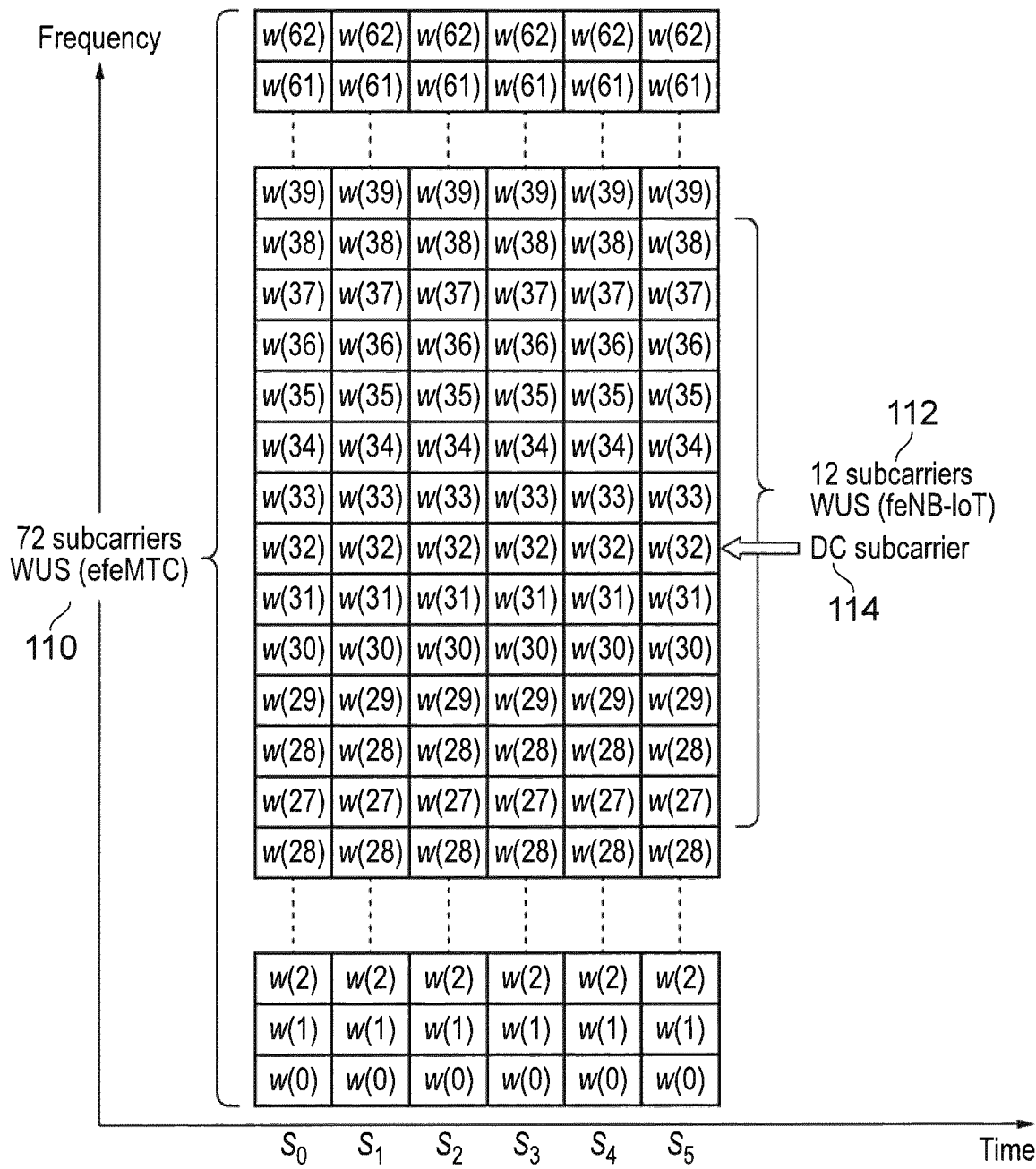
FIG. 11 illustrates an example of a subset of WUS sequences in the frequency domain which may be used for feNB-IoT in accordance with embodiments of the present technique.

In some embodiments of the present technique, a subset of the WUS sequences (in the frequency domain) can be used by a UE with a smaller bandwidth. In other words, the wake-up signal is selected dependent on a bandwidth capability of the communications device. For example, efeMTC UEs use 6 PRBs (72 sub-carriers for which $N_{SC}=63$) whilst feNB-IoT UEs use 1 PRB (12 subcarriers for which $N_{SC}=11$). Here, a single WUS can be used by both efeMTC UEs and feNB-IoT UEs where the feNB-IoT UEs need only to read a subset (12 out of 72 subcarriers) of the WUS. An example implementation is shown in FIG. 11, where a 63 subcarrier length WUS sequence is used, and this occupies the 6 PRB narrowband or 72 subcarriers 110 (e.g. using an arrangement as that shown in FIG. 9). The ZC root is selected such that the central 11 subcarriers form another ZC sequence with a length of 11. In this way, the central 12 subcarriers 112 can be used for feNB-IoT which has a narrower bandwidth (1 PRB). The central subcarrier 114 is nulled as it would coincide with the DC subcarrier of the UE. Although in this example the central 12 subcarriers 112 are used for feNB-IoT, it should be noted that other subsets of 12 subcarriers can also be used, but it may in such cases be necessary to null another subcarrier to act as the DC subcarrier for feNB-IoT. It should be appreciated that a larger number of WUS preamble symbols may be required for feNB-IoT because of the narrow bandwidth if the same dynamic range is required for WUS detection as for efeMTC.

In some embodiments of the present technique, the WUS preamble for feNB-IoT can be designed with its own organic ZC of length $N_{SC}=11$ and commensurate PN sequence. In other words, each of the plurality of wake-up signals are transmitted with a unique reference sequence.

In some embodiments of the present technique, the WUS is transmitted in a Single Frequency Network (SFN) manner. Here, two or more eNBs have a common WUS configuration for one or more groups of UEs. In such embodiments, some common parameters such as paging configuration need to be common such that the WUS is transmitted at the same time to the same group of UEs. This will enhance the WUS signal thereby reducing misdetection probability.

WUS Information Part

As described above, such as in relation to FIG. 5, the WUS can also contain an information part with symbol length $N_d$. This information part can carry signaling such as UE group ID as described in [10]. In some embodiments of the present technique, the information part also provides information to reduce a number of UE blind decodes on the MPDCCH. For example, it can indicate a reduced MPDCCH search space or indicate the exact MPDCCH candidate used to carry the DCI.

The WUS information part is composed of $N_d$ OFDM symbols, each of which carries the preamble reference sequence of the last preamble symbol derived from the dot product of the ZC and PN sequences. Signaling information is also carried in each of the symbols. In embodiments of the present technique where only the WUS preamble as in FIG. 6 is required, $N_d=0$. The signaling information carried in each symbol is conveyed using a post-IDFT cyclic shift of the symbol with the amount of shift dependent on the information to be carried in the particular symbol. In the above described embodiments of the present technique in which the WUS uses 6 PRBs for example, and each WUS information part symbol comprises 72 time domain samples, there are up to 72 possible shifts available to carry $\log_2(72)$ ~=6 bits per symbol in this way. However, in preferred embodiments of the present technique, and in order to ensure reasonable distance between useable cyclic shifts, only 3 bits are carried per WUS information part symbol. The total number of signalling bits to be transmitted ($3N_d$ in this embodiment) can therefore be increased by increasing the number $N_d$ of WUS information part symbols. In other words, the wake-up signal comprises an information part, the information part comprising a plurality of OFDM symbols each being modulated with the reference sequence of the preceding preamble OFDM symbol and signalling information. In such embodiments, the information part may comprise information used by the communications device to decode the downlink message transmitted by the first infrastructure equipment. each of the plurality of OFDM symbols of the information part may carry a predetermined number of signalling bits which carry the signalling information, and in some embodiments, this predetermined number of signalling bits is three. As described, in some embodiments the method comprises, at the first infrastructure equipment, carrying out a cyclic shift of each of the OFDM symbols of the information part to indicate the signalling information, wherein a magnitude of the cyclic shift for each of the OFDM symbols is dependent on the information being signalled by the each of the OFDM symbols. The cyclic shift carried out on each of the OFDM symbols of the information part may be encoded differently in relation to the cyclic shift carried out on neighbouring OFDM symbols of the each of the OFDM symbols of the information part.

Figure 12:
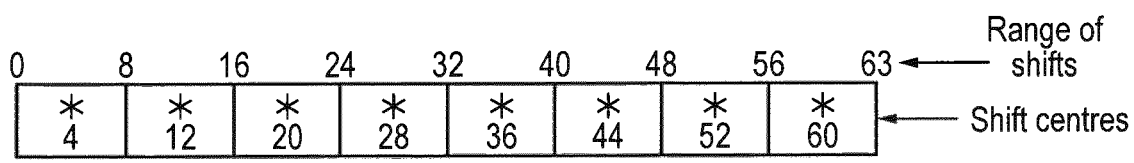
FIG. 12 demonstrates an example of optimum shift centres over the range of possible shifts in an example where 63 subcarriers are used and each WUS information part symbol carries three bits of signalling in accordance with embodiments of the present technique.

FIG. 12 illustrates the best centres (denoted by a star indicating the position of the subcarrier) achievable for an optimum distribution of all the transmissible values over the full shift range for an IDFT output sequence of 64. After the cyclic shift, the cyclic prefix is then added as usual.

TABLE I

Cyclic shift assignment compliant with Gray coding

| Value | Cyclic Shift |
| --- | --- |
| 000 | 4 |
| 001 | 12 |

TABLE I-continued

Cyclic shift assignment compliant with Gray coding

| Value | Cyclic Shift |
| --- | --- |
| 010 | 28 |
| 011 | 20 |
| 100 | 44 |
| 101 | 52 |
| 110 | 36 |
| 111 | 60 |

In some embodiments of the present technique, the mapping between transmitted codes and neighboring shift centres is arranged so that adjacent cyclic shifts represent transmission codes that between them exhibit a Hamming distance of one. This ensures a level of Gray coding for the transmissible values. Table I above is an example to ensure this Gray coding between transmissible values.

In some embodiments of the present technique, and in order to minimize channel estimation requirements at the UE, the cyclic shifts imprinted on neighboring WUS information part symbols are differentially encoded. The differentially-encoded absolute cyclic shift, $M_n$ ($0<M_n<N_{FFT}$), applied to the nth WUS information part symbol is calculated by summing the differentially-encoded absolute cyclic shift for symbol n-1 and the relative cyclic shift for symbol n taken for example from Table I above, modulo the length of the IDFT output time domain sequence:

$$M_n = \begin{cases} 0 & n = 0 \\ (M_{n-1} + \tilde{M}_n) \bmod N_{FFT} & 1 \leq n \leq N_d \end{cases}$$

The absolute cyclic shift is then applied to obtain the time domain cyclic shifted sequence from the output of the transmitter IDFT operation:

$$A_n(t) = \tilde{A}_n((t+M_n) \bmod N_{FFT})$$

Receiver Side Processing at the UE

Figure 13:
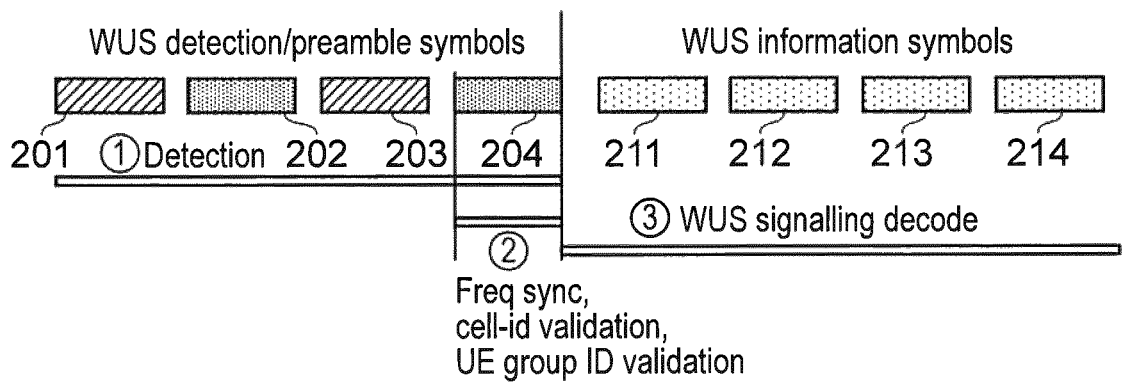
FIG. 13 shows an example of a WUS preamble detector and decoding sequencer in accordance with embodiments of the present technique.

Embodiments of the present technique can provide a receiver for detecting a WUS preamble signal and also for recovering signalling information from the part of the WUS signal which is carrying signalling information. In accordance with the present technique, FIG. 13 represents the part process diagram indicating a sequence of events of a receiver when detecting WUS preamble symbols and also decoding WUS information bearing symbols. As shown in FIG. 13, each of the blocks represents a time domain OFDM symbol carrying part of the WUS signal. In the first processing event performed by the receiver, labelled 1, the receiver detects the presence of the WUS preamble. For the example shown in FIG. 13, four OFDM symbols forming the WUS preamble signal are shown 201, 202, 203, 204. As illustrated by FIG. 13, the OFDM symbols shown without a hatch representation 202, 204 are odd OFDM symbols so no frequency shift has been applied to the symbols. In contrast, the even OFDM symbols 201, 203 have been generated with a frequency shift with respect to the odd numbered OFDM symbols 202, 204. Therefore during the first processing event of the receiver, the receiver detects the presence of the WUS signal. In the second phase, labelled 2 in FIG. 13, the receiver detects the frequency synchronisation or frequency offset, as well as the time synchronisation, the cell ID validation and the UE group validation carried by the reference sequence formed by the PN sequence and the ZC sequence.

In the third processing event performed by the receiver, labelled 3 in FIG. 13, the receiver detects the WUS OFDM symbols carrying signalling data and decodes the signalling data. As illustrated by FIG. 13 in this example there are four WUS OFDM symbols 211, 212, 213, 214, shown with solid boxes. These OFDM symbols correspond to those shown above for WUS signals carrying signalling data and so are decoded differently after the frequency and time synchronisation have been acquired as well as the cell ID and the UE group ID validated from the WUS preamble symbols.

Figure 14:
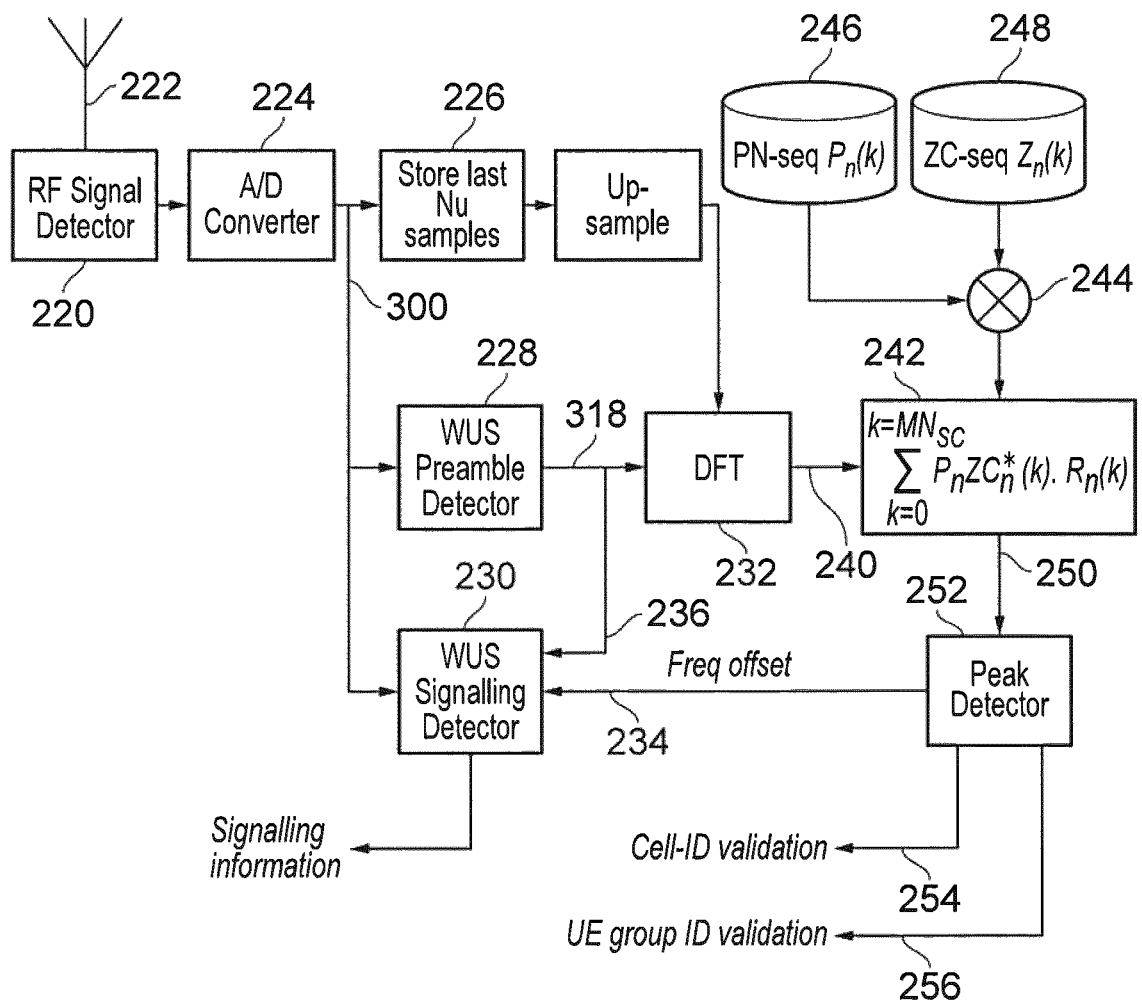
FIG. 14 schematically represents an exemplary detector for a WUS preamble made up of a pair of symbols in accordance with embodiments of the present technique.

As described above, FIG. 13 illustrates a WUS with 4 symbols in the preamble and 4 data symbols. The spaces between symbols represent the cyclic-prefix. During the first decoding process, detection (labelled 1), it is expected that the UE will tune to a bandwidth comprised of all the PRBs of the WUS signal e.g. 6 PRBs=72 sub-carriers for efeMTC or 1 PRBs=12 sub-carriers for feNB-IoT. Preamble detection happens in the time domain after analogue to digital conversion. The schematic of a detector for a WUS preamble made up of a pair of symbols is illustrated in FIG. 14, and is discussed in further detail below. When a WUS preamble is made up of $N_p/2$ pairs of preamble symbols, $N_p/2$ sets of this detector can be daisy chained as illustrated in FIG. 16, and this is also discussed in further detail below. WUS detection happens when a correlation peak at the output of the $N_S$ length moving (MA) average filter of the detector of FIG. 15 exceeds a configured or fixed threshold. Detection also means that the start of the last WUS preamble symbol which is always a non-frequency shifted symbol is known because it lies at $(I-N_u)$ samples before the peak sample— where I is the index of the peak sample and Nu is the number of samples per OFDM symbol (excluding the cyclic prefix). Therefore preamble detection also provides symbol time detection for the WUS.

The second decoding process is frequency synchronisation and Cell ID validation (labelled 2). With the symbol time acquired, the UE carries out a $N_{SC}$ point discrete Fourier transform (DFT) on the last $N_u$ stored input samples preceding the detection peak location. The UE can then blindly detect the used PN sequence, ZC root etc. via frequency correlation of the DFT result with the candidate PN and ZC sequences. The UE can also detect any frequency offsets on the signal by searching for the candidate sequences over a frequency range that covers the maximum expected frequency offsets—both negative and positive offsets. The correlation peaking for a particular PN and/or ZC at a particular frequency offset would thereby validate both the PN sequence (Cell ID and/or preamble symbol index) and/or ZC sequence roots as well as reveal the frequency offset. In other arrangements of embodiments of the present technique, the DFT result can be up-sampled by carrying out instead a $M*N_{SC}$ point DFT for PN sequence and/or ZC sequence validation. The frequency offset search over this up-sampled DFT result will also provide sub-carrier spacing frequency offsets.

The third decoding process is WUS signaling decoding (labelled 3). With the frequency offset detected, it can be removed, following which the WUS signalling symbols (if any) are decoded to extract any additional signaling information they may carry.

A schematic block diagram of a receiver configured to detect the WUS preamble symbols as well as the WUS information symbols and decoding the WUS information symbols is shown in FIG. 14. As shown in FIG. 14, a first RF detector block 220 detects radio frequency signals using an antenna 222 which may or may not be a plurality of antennas in which the receiver includes MIMO techniques. The RF signal detector 220 detects the RF signal using various RF filters and circuits and now converts the RF signal to the baseband representing the data modulating the carrier signals as a baseband analogue signal. The baseband analogue signal is then sent to an analogue to digital converter 224 which converts the analogue baseband signal into a sampled digital signal in accordance with a sampling rate consistent with the highest frequency of the baseband signal carried by the subcarriers of the OFDM symbols. The samples are then fed to a data store 226 which stores the last useful number of samples of the OFDM symbols as $N_U$ samples pending conversion into the frequency domain once the symbol timing period for the $N_U$ useful samples has been detected. The discrete samples of the baseband signal are also fed to a WUS preamble detector 228 and a WUS signalling detector 230 which are explained in more detail below. However the WUS preamble detector as explained above serves to perform the first decoding process operation (labelled 1) shown in FIG. 13 and the second decoding process operation (labelled 2). Accordingly, the WUS preamble detector generates an estimate of the symbol timing to trigger the discreet Fourier transform of the useful part of the OFDM symbols into the frequency domain which is performed by a discreet Fourier transform processor 232. In contrast, the WUS signal detector 230 performs a detection of the signalling data carried by the WUS information symbols 211, 212, 213, 214 during the third decoding processing event (labelled 3) shown in FIG. 14. The WUS signalling detector 230 receives an indication of the frequency offset from an input channel 234 and timing of the received symbols from the output of the WUS preamble detector 228 on input channel 236.

After transforming a useful part of the OFDM symbols into the frequency domain provided at an output 240 of the discreet Fourier transform process 232, a cross correlation processor 242 correlates the frequency domain samples of each of the OFDM symbols with a regenerated reference sequence formed by multiplying the PN sequence with the ZC sequence by a multiplier 244. Each of the PN sequences and ZC sequences are regenerated from a store 246, 248 so that each of the possible PN sequences which could have been used to form the reference sequence and each of the ZC sequences which could have been formed to generate the reference sequence are regenerated and fed to the multiplier 244 for multiplication. This is carried out so that the cross correlation process 242 can cross correlate each of the possible PN sequences and each of the possible ZC sequences in order to perform a blind decoding of the reference sequence which is carried by the WUS preamble. Thus an output 250 a cross correlation result is provided which is fed to a peak detector 252. A peak output of each of the possible reference sequences correlated with the received WUS preamble is then analysed by the peak detector 252 and that combination of the PN sequence and ZC sequence producing a reference sequence which generates the peak output identifies the PN sequence and the ZC sequence used to form the reference sequence of the WUS preamble. Accordingly, the peak detector 252 can output on a first output channel 254 an indication of the cell ID validation represented by the PN sequence and the UE group ID validation on a second output channel 256 represented by the ZC sequence. As a consequence, the peak detector also identifies a frequency offset which is present in the WUS preamble, which is an output on the output channel 234 for the WUS signal detector 230.

Figure 15:
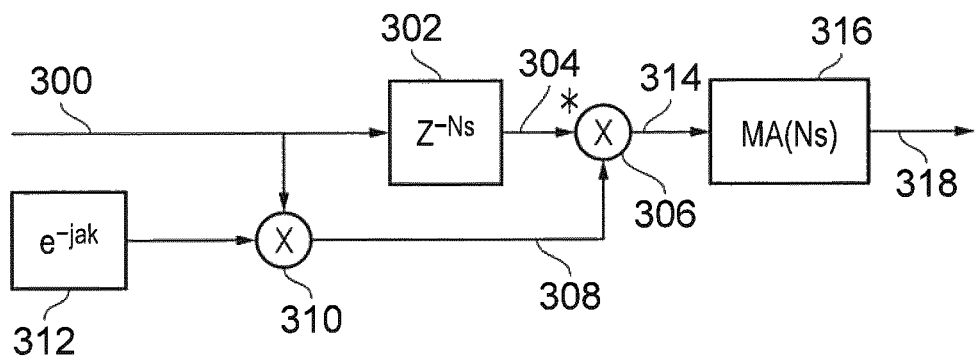
FIG. 15 shows an example of a single symbol pair detector for a WUS preamble in accordance with embodiments of the present technique.
Figure 16:
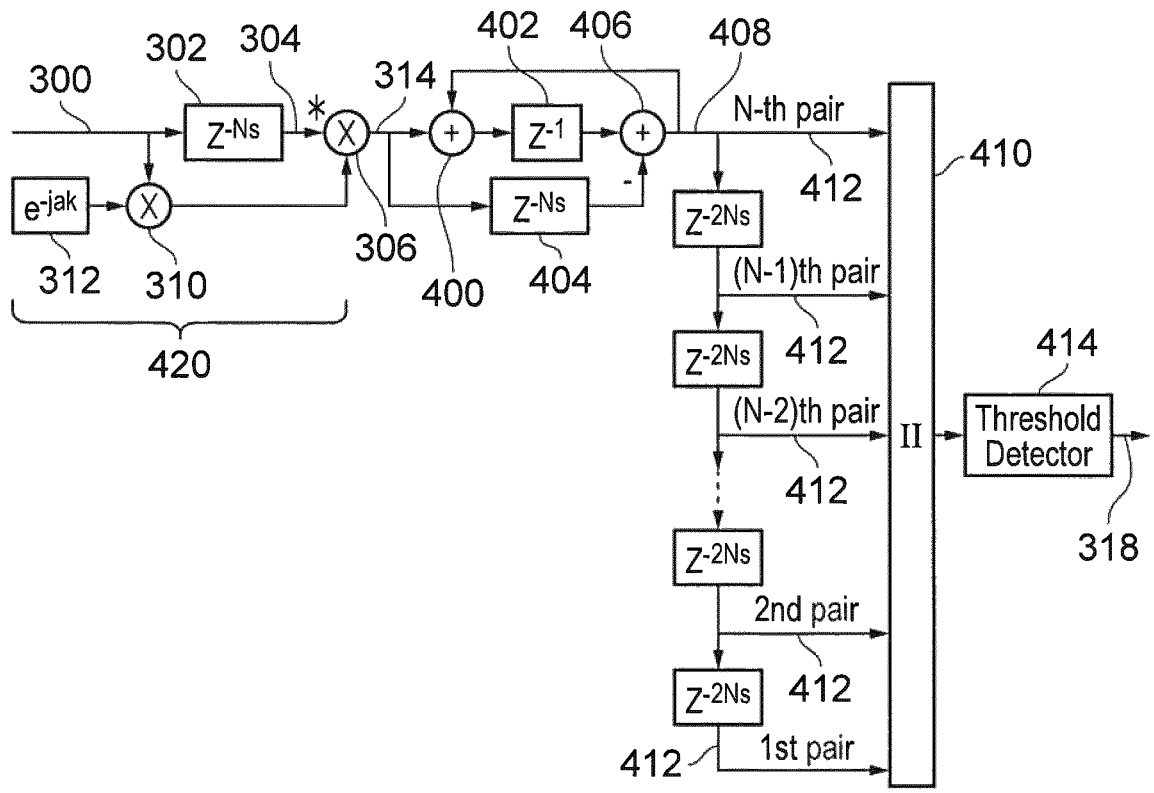
FIG. 16 shows an example of a cascade detector for N pairs of WUS preamble symbols in accordance with embodiments of the present technique.

A more detailed example of the WUS preamble detector 228 is regarded by FIG. 15. Essentially, FIG. 15 provides a schematic block diagram providing example of a cross correlator which performs a correlation of the respective samples of successive OFDM symbols forming the WUS preamble symbol pairs. As shown in FIG. 15, the digital samples are received from an input channel 300, and are fed to a delay circuit 302 which delays the samples from the input to an output by Ns samples, which is the number of samples in each OFDM symbol including the cyclic prefix. The output of the delay circuit 302 feeds a first input 304 to a multiplier 306 with a conjugate operator. A second input receives samples of the OFDM symbol without delay from a multiplier 310 which receives a complex phase shift from a frequency shift generator 312 corresponding to a possible frequency shift applied to the even OFDM symbols of the WUS preamble. At an output 314 of the multiplier 310 a cross correlation of the samples is formed so that a moving averaging filter 316 can detect a point at which the correlation is maximum which corresponds to an indication of the possible sample index for the end of the preamble symbol pair 312. Accordingly at an output 318 a peak is indicated which corresponds to not only a detection of the WUS preamble but also an indication of the symbol timing for triggering the discrete Fourier transform processor 232 and confirmation of the frequency shift applied to one of the OFDM symbols of the wake-up signal preamble with respect to the other of the OFDM symbols of the wake-up signal preamble.

An example embodiment of the present technique shown in FIG. 15 is for forming a cross correlation between a single pair of OFDM symbols of the WUS preamble. FIG. 16, however, provides a schematic block diagram of a WUS preamble detector 228 in which a plurality of pairs of OFDM symbols of the WUS preamble are used to form improved detection results of the WUS preamble. Elements shown in FIG. 16 correspond to those shown in FIG. 15 with corresponding reference numerals. Thus as shown in FIG. 16 a first processing section 420 corresponds to the circuits of the single pair of OFDM symbols of the WUS preamble shown in FIG. 15. However as shown in FIG. 16, at an output of the multiplier 306 there is provided a moving average accumulator arrangement in which an adder 400 is arranged to receive an add the new input sample to the previous value in the accumulator stored in sample delay 402. Furthermore, a sample delayed by Ns samples using a delay element 404 serves to subtract from the output of the accumulator for successive digital signal samples from a corresponding part of the previous OFDM symbol which is formed at an output of an adder 406. An output 408 of the adder 406 is then fed to accumulator circuit 410 which effectively forms a sum of each of a plurality of n pairs of OFDM symbols which form the WUS preamble. Thus, each differentially decoded correlation output is delayed by a further 2*Ns samples which corresponds to two OFDM symbols so that on each of a plurality of n inputs 412 to the accumulation processor 410, there is provided an output n of the N pairs of OFDM symbols. Accordingly at an output of the accumulation processor 410 a peak is detected by a threshold detector 414 which therefore performs at the output 318 an indication of a peak corresponding to a detection of the WUS preamble and which also provides a symbol time indicator for triggering the DFT processor 232 as explained above.

In other words, in terms of the receiving device, this device is, in embodiments of the present technique, a UE or a communications device for transmitting data to or receiving data from an infrastructure equipment of a wireless communications network, the communications device comprising transmitter circuitry for transmitting signals representing data via a wireless access interface provided by the infrastructure equipment, receiver circuitry for receiving signals representing data transmitted from the infrastructure equipment via the wireless access interface, and controller circuitry for controlling the transmitter circuitry and the receiver circuitry to transmit the data to the infrastructure equipment and to receive the data from the infrastructure equipment, wherein the receiver circuitry includes a front-end receiver configured to receive signals including a wake-up signal transmitted from the infrastructure equipment, the wake-up signal indicating that the communications device will receive a downlink message from the infrastructure equipment for the communications device to decode, the wake-up signal comprising a wake-up signal preamble including a plurality of Orthogonal Frequency Division Multiplexed, OFDM, symbols each being combined with a reference sequence, and one or more of the OFDM symbols being shifted in frequency with respect to one or more of the other OFDM symbols, and a receiver at the UE with a frontend processor to generate digital signal samples of each of the plurality of OFDM symbols of the wake-up signal preamble, and a wake-up signal detector comprising a correlator configured to correlate at least one of the OFDM symbols of the wake-up signal preamble with another of the OFDM symbols of the wake-up signal preamble to generate a correlation output signal, and a correlation peak detector configured to detect the wake-up signal preamble from a peak of the correlation output signal.

In some embodiments of the present technique, the wake-up signal preamble comprises at least one pair of the OFDM symbols, each of the OFDM symbols of the pair having been modulated with the reference sequence and a first of the OFDM symbols of the pair being shifted in frequency with respect to a second of the OFDM symbol of the pair by a predetermined frequency shift, and the correlator of the wake-up signal detector is configured to correlate the first of the OFDM symbols of the pair with the second of the OFDM symbols of the pair to generate the correlation output signal. In other embodiments of the present technique, the wake-up signal preamble comprises a plurality of pairs of the OFDM symbols, each of the OFDM symbols of the pair having been modulated with the reference sequence and a first of the OFDM symbols of the pair being shifted in frequency with respect to a second of the OFDM symbol of the pair by a predetermined frequency shift, and the correlator of the wake-up signal detector is configured for each of the pairs of OFDM symbols to correlate the first of the OFDM symbols of the pair with the second of the OFDM symbols of the pair to generate an intermediate output signal, and the correlation peak detector includes a combiner, which combines the intermediate output signals from the correlators for each of the pairs of OFDM symbols to form the correlation output signal.

In either of the above cases, the wake-up signal detector is configured to estimate an OFDM symbol synchronisation signal identifying a temporal period in which the received digital signal samples of a useful part of each of the OFDM symbols is present in the received signal, the OFDM symbol synchronisation signal being estimated from the peak of the correlation output signal and a number of the sub-carriers of each of the OFDM symbols, and the receiver circuitry comprises a Fourier transform processor configured to receive the digital signal samples of the signal received from the front-end receiver and the OFDM symbol synchronisation signal and to convert the OFDM symbols of the wake-up signal into the frequency domain, a reference sequence correlator configured to cross-correlate each of the frequency domain OFDM symbols of the wake-up signal preamble with a regenerated version of the reference sequence to form an output correlation signal, and a reference sequence detector configured to detect a peak of the reference sequence correlator from the output correlation signal received from the reference sequence correlator. In some embodiments, the reference sequence detector is configured to generate, from a peak value of the output correlation signal received from the reference sequence detector, an estimate of at least one of a frequency offset of the received signal. In some embodiments, the frequency shift applied to one of the OFDM symbols of the wake-up signal preamble with respect to the other of the OFDM symbols of the wake-up signal preamble represents a first part of signalling information for the communications device, the controller circuitry being configured with the receiver circuitry to estimate the first part of the signalling data from the peak value of the output correlation signal received from the reference sequence detector by the reference sequence detector. The reference sequence is selected from one of a plurality of possible reference sequences, the selection of the reference sequence from the plurality of possible reference sequences representing a second part of the signalling information for the communications device, and the reference sequence correlator is configured to cross-correlate each of the frequency domain OFDM symbols of the wake-up signal preamble with a regenerated version of each of the possible reference sequences to form a corresponding plurality of output correlation signals, and the reference sequence detector is configured to identify the reference sequence combined with the OFDM symbols of the wake-up signal from the plurality of possible reference sequence correlators for identifying the first signalling information. The reference sequence is formed from a combination of a pseudo-noise sequence and a Zadoff-Chu sequence, each of the pseudo-noise sequence and the Zadoff-Chu sequence being selected from one of a plurality of possible pseudo-noise sequences representing a third part of the signalling information and one of a plurality of possible Zadoff-Chu sequences representing a fourth part of the signalling information respectively, and to regenerate each of the possible versions of the reference sequences by combining each of the plurality of possible Zadoff-Chu sequences with each of the plurality of possible pseudo-noise sequences, and the controller circuitry is configured with the receiver circuitry to confirm the third and the fourth part of the signalling data from the peak value of the output correlation signals received from the reference sequence correlators.

In some of the above described receiver side embodiments of the present technique, the wake-up signal comprises a signalling part transmitted after the preamble, the signalling part of the wake-up signal comprising a plurality of OFDM symbols each having been combined with the reference sequence and each having a cyclic shift applied to time domain samples of the OFDM symbol, the cyclic shift representing a fifth part of the signalling information, and the receiver circuitry comprises a wake-up signal signalling part detector, the wake-up signal signalling part detector comprising a signalling part correlator configured to receive the time domain received digital signal samples to form a frequency domain version of each of two successive OFDM symbols of the signalling part of the wake-up signal and to multiply respective frequency domain samples of one with the complex conjugate of the other to form an intermediate correlation result, a divider configured to divide the intermediate correlation result with respect to combined samples of the PN sequences for the each of two successive OFDM symbols to form a second intermediate result, an inverse Fourier transformer configured to convert the second intermediate result into the time domain, and a peak detector configured to detect a peak value of the time domain version of the samples of the second intermediate result, the peak value providing an indication of the cyclic shift of the OFDM symbols of the signalling part of the wake-up signal for estimating the fifth part of the signalling information.

In some of the above described receiver side embodiments of the present technique, the first part, the second part, the third part, the fourth part or the fifth part represent at least one of all of a cell identifier, a group identifier of the communications device, an indication that system information has changed, an indication of which signalling information has changed.

WUS Signalling Decoding

Signaling is carried in each of the WUS information part symbols. The signaling codes are encoded as relative cyclic shifts of the time domain OFDM symbol. The relative cyclic shifts are also differentially encoded from symbol to symbol. A decoding process could therefore be to detect the relative cyclic shift on the given symbol and then differentially decode this with the previous symbol's cyclic shift. A preferred embodiment of the present technique is to take into account the differential cyclic shift in the decoding process itself. This has the advantage that explicit channel estimation and correction which are rather computationally intensive can be avoided.

Let $R_n(k)$, $H_n(k)$, $P_n(k)$, $Z_n(k)$ be respectively the received spectrum sequence, the channel transfer function, the used PN sequence and the used ZC sequence for the n-th symbol where k is the sub-carrier index. Further, let $M_{n-1}$ be the absolute cyclic shift on symbol n-1 whilst the incremental cyclic shift relative to symbol n-1 that encodes the signalling parameter carried in symbol n is m. Then for WUS information part symbols n-1 and n and for embodiments in which, $Z(k)=Z_{n-1}(k)=Z_n(k)$, i.e the same ZC sequence is used for the preamble and all WUS information parts, and designating the noise in symbol n as $N_n(k)$, it can be written:

$$R_{n-1}(k)=H_{n-1}(k) \cdot Z(k) \cdot P_{n-1}(k) \cdot e^{-j2\pi k M_{n-1}/N_{FFT}}+N_{n-1}(k)$$

$$R_n(k)=H_n(k) \cdot Z(k) \cdot P_n(k) \cdot e^{-j2\pi(M_{n-1}+m)k/N_{FFT}}+N_n(k)$$

It should be recalled that for n-1=0, $M_{n-1}=0$ i.e. there is no cyclic shift on the last preamble symbol prior to the first WUS information part symbol. The decoding algorithm entails dividing $R_{n-1}(k)$ by $R_n(k)$ and finding the phase slope of the residual signal that represents the relative m-sample cyclic shift between the two symbols. The following can therefore be executed:

$$\frac{R_{n-1}(k)}{R_n(k)} = \frac{H_{n-1}(k) \cdot Z(k) \cdot P_{n-1}(k) \cdot e^{-(j2\pi M)_{n-1}k/N_{FFT}} + N_{n-1}(k)}{H_n(k) \cdot Z(k) \cdot P_n(k) \cdot e^{-j2\pi k(M_{n-1}+m)/N_{FFT}} + N_n(k)}$$

Given the short duration of each primary or WUS information part symbol, it is reasonable to assume that the channel will effectively remain constant between the two consecutive symbols i.e. $H(k)=H_{n-1}(k)=H_n(k)$.

In the above equation, the noise becomes multiplicative thereby resulting in an intractable analysis and poor performance. Nevertheless, since the relative cyclic shift that is desired to be decoded is in the phase slope, the amplitudes of any of the component results of the above equation are not of any particular interest. The division by $R_n(k)$ can therefore be changed to a multiplication by its conjugate. This avoids the intractable maths and produces a result in which all the noise is additive to the main phase signal. As far as the phase slope is concerned, the result from dividing is equivalent to that from multiplying with the conjugate:

$$\frac{R_{n-1}(k)}{R_n(k)} \cong R_{n-1}(k) R_n^*(k)$$

Therefore, ignoring the index k, the left hand side can be expanded as follows:

$$R_{n-1} R_n^* = (H \cdot Z \cdot P n_{n-1} \cdot e^{-j2\pi M_{n-1}/N_{FFT}} + N_{n-1})^*$$
$$(H \cdot Z \cdot P_n \cdot e^{-j2\pi (M_{n-1}+m)/N_{FFT}} + N_n)^*$$

Expanding and in embodiments where $P_n \neq P_{n-1}$, dividing with $P_n$ and $P_{n-1}$ (or multiply with—since both are bipolar):

$$R_{n-1} R_n^* = e^{j2\pi m/N_{FFT}} + H \cdot Z \cdot P_n \cdot e^{-j\beta} \cdot N_n^* +$$
$$H^* \cdot Z^* \cdot P_{n-1} e^{j\alpha} \cdot N_{n-1} + P_{n-1} P_n N_{n-1} \cdot N_n^*$$

where $\alpha = 2\pi(M_{n-1}+m)/N_{FFT}$ and $\beta = 2\pi M_{n-1}/N_{FFT}$.

The second and third terms of the right-hand side are modulated noise whilst the last term is just plain white noise—it should be recalled that $P_n$ and $P_{n-1}$ are bipolar sequences. As all the noise is additive, the combined power of these terms depends on the SNR of the received signal. It can therefore be expected that at reasonable levels of SNR, the argument or phase trajectory of the result would be dominated by the first term on the right. Thus by detecting the phase slope of the result, m, the relative cyclic shift between the two symbols, can be detected. Further, the cyclic shift can also be detected by carrying out an IFFT on the result and taking the sample location of the peak amplitude since:

$$IFFT(e^{-j2\pi mk/N_{FFT}}) = FFT(e^{j2\pi mk/N_{FFT}})/N_{FFT}$$

Figure 17:
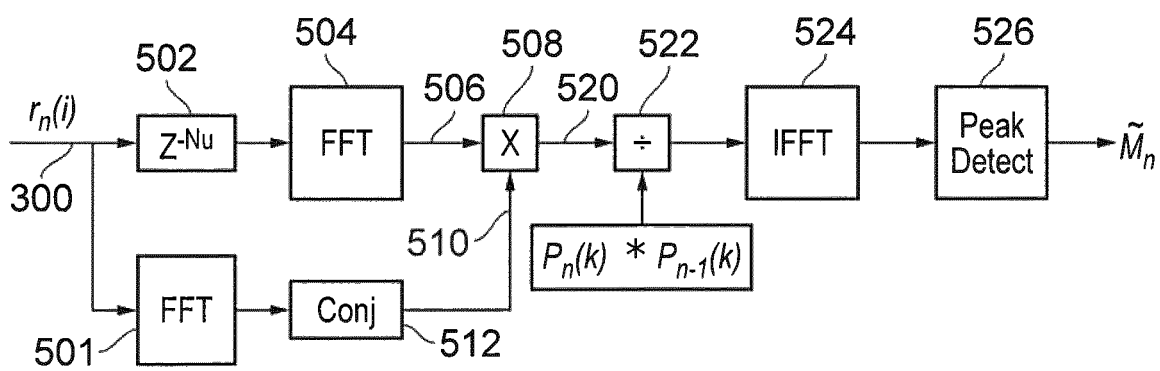
FIG. 17 schematically represents an example of the decoding of each WUS information part symbol in accordance with embodiments of the present technique.

FIG. 17 provides an example implementation of a WUS signal detector 230 in accordance with an example embodiment of the present technique. As shown in FIG. 17, at an input 300 the samples of the digital baseband signal of the OFDM symbols is fed to a fast Fourier transform processor 501 and also to a delay element 502. The delay element 502 delays the signal by the number of samples corresponding to the useful part of the OFDM symbols nu. The delayed signal samples from the output of the delay element 502 are then fed to fast Fourier transform processor 504 which feeds in a frequency domain version of the useful part of the OFDM symbol to a first input 506 of a multiplier 508. Likewise, the first Fourier transform processor 501 feeds frequency domain samples of the OFDM symbol to a second input 510 of the multiplier 508 via a conjugator 512. The FFT processors 501 and 504 convert the time delayed samples of the useful part of the OFDM symbols from the pair of WUS information bearing signals into the frequency domain. To this end, the FFT transform processors 501 and 504 receive as an input the symbol timing determined by the WUS preamble detector 228. Thus the elements 501, 502, 504, 508, 512 together form a cross correlation of samples from successive OFDM symbols of a pair of WUS information bearing signals. An output of the multiplier 520 is fed to a divider 522 which divides the correlation result by a combination of the PN sequences applied to form the reference sequence for successive OFDM symbols. An inverse Fourier transform processer 524 then converts the divided result into the time domain and a peak detector 526 detects a peak in the output which generates an indication of the signalling data carried by the information bearing part of the WUS signal.

FIG. 17 therefore illustrates the algorithm described above—the input is assumed to be stripped of the cyclic prefixes. The transmitted cyclic shift $\tilde{M}_n$ is determined from matching the peak index back to the closest center in FIG. 12 and then the transmitted code is decoded by look up from Table I.

As described above, embodiments of the present technique allow for a Wake-Up Signal preamble sequence design which reduces power usage, is detectable in a non-coherent manner and in poor radio conditions, and is able to carry information.

Embodiments of the present technique, as described above, provided an arrangement for transmitting various types of signalling information. As indicated above, the Zadoff-Chu sequence roots can be used for specific purposes as indicating UE coverage level, specific UE groups, changes in System Information and tracking areas. Furthermore various ways of initializing or generating the PN function/sequence can also be used to convey signalling information. Furthermore a frequency shift between each pair of WUS symbols can be used to convey signalling information of various types such as UE ID, group ID etc. However, it will be readily appreciated by those skilled in the art that various different types of signalling information can be conveyed using these techniques other than those explicitly presented in the above examples or are interchangeable. Likewise applications of the ZC and PN sequences could be equally applied to reception methods and architectures as described herein, or indeed these reference sequences (or frequency shifts) could be dependent upon one or more other different types of signalling information that is desired to be conveyed to the communications device by the network. Equally, the reception methods and architectures are described in terms of first to fifth parts of signalling information, and it would be appreciated by those skilled in the art that these parts of signalling information could correspond to those described in relation to the herein described transmission methods and architectures (specifically in terms of variations of the reference sequence and frequency shifts) or any other kind of signalling information.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating a first infrastructure equipment in a wireless communications system comprising the first infrastructure equipment, a second infrastructure equipment and a communications device, wherein the method comprises:

receiving a command from the second infrastructure equipment comprising an indication that a downlink message for the communications device to decode should be transmitted by the first infrastructure equipment and that a wake-up signal should be transmitted by the first infrastructure equipment to the communications device in advance of transmitting the downlink message; and transmitting the wake-up signal to the communications device in advance of transmitting the downlink message to provide the communications device with an indication that the downlink message for the communications device to decode will be transmitted, wherein the wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols.

Paragraph 2. A method according to Paragraph 1, wherein each of the OFDM symbols forming the preamble of the wake-up signal are associated with a unique symbol index, and wherein the OFDM symbols which are transmitted having been shifted in frequency with respect to the frequency of the successive other OFDM symbols are those with an even symbol index.

Paragraph 3. A method according to Paragraph 1 or Paragraph 2, wherein the OFDM symbols which are transmitted having been shifted in frequency with respect to the frequency of the successive other OFDM symbols are each transmitted having been shifted in frequency by a same amount.

Paragraph 4. A method according to Paragraph 2, wherein the OFDM symbols which are transmitted having been shifted in frequency with respect to the frequency of the successive other OFDM symbols are each transmitted having been shifted in frequency by an amount dependent on their symbol index.

Paragraph 5. A method according to any of Paragraphs 1 to 4, wherein the wake-up signal is transmitted in a substantially central portion of a narrow band channel of a wireless access interface of the wireless communications system.

Paragraph 6. A method according to Paragraph 5, wherein the wake-up signal occupies sixty three subcarriers of the narrow band channel, wherein the narrow band channel is formed in a first bandwidth smaller than and contained within a host bandwidth in which the first infrastructure equipment is able to transmit and receive signals.

Paragraph 7. A method according to Paragraph 5, wherein the method comprises modulating the OFDM symbol carried by the central sub-carrier of the portion of the narrow band channel in which the wake-up signal is transmitted with zero.

Paragraph 8. A method according to any of Paragraphs 1 to 7, wherein the method comprises determining that the plurality of OFDM symbols form a plurality of pairs of OFDM symbols, each pair of OFDM symbols being formed of one of the OFDM symbols which are transmitted having been shifted in frequency with respect to the frequency of the successive other OFDM symbols and the respective successive other OFDM symbol, and transmitting the same unique reference sequence in both OFDM symbols of each pair of OFDM symbols.

Paragraph 9. A method according to Paragraph 8, wherein each of the OFDM symbols forming the preamble of the wake-up signal are associated with a unique symbol index, and each pair of OFDM symbols is associated with a unique pair index, and wherein the unique reference sequence of each pair of OFDM symbols is dependent on one or both of the symbol index and the pair index.

Paragraph 10. A method according to Paragraph 9, wherein the unique reference sequence of each pair of OFDM symbols is a segment of a long reference sequence, a length of which is determined as the product of a total number of the plurality of the OFDM symbols of preamble of the wake-up signal and a number of subcarriers per OFDM symbol that are modulated with the reference sequence, wherein the segment of the long reference sequence is dependent on the symbol index.

Paragraph 11. A method according to any of Paragraphs 1 to 10, wherein the OFDM symbols are transmitted with a reference sequence dependent on a unique identifier of the communications device.

Paragraph 12. A method according to any of Paragraphs 1 to 11, wherein the OFDM symbols are transmitted with a reference sequence dependent on a unique identifier of a group of communications devices comprising at least the communications device.

Paragraph 13. A method according to Paragraph 12, wherein the OFDM symbols which are transmitted having been shifted in frequency with respect to the frequency of the successive other OFDM symbols are each transmitted having been shifted in frequency by an amount dependent on a determination by the first infrastructure equipment as to whether to indicate to the communications device one of whether a downlink message for the communications device to decode is to be transmitted by the first infrastructure equipment or no downlink message for the communications device to decode is to be transmitted.

Paragraph 14. A method according to any of Paragraphs 1 to 13, wherein the OFDM symbols which are transmitted having been shifted in frequency with respect to the frequency of the successive other OFDM symbols are each transmitted having been shifted in frequency by an amount dependent on a unique identifier of a group of communications devices comprising at least the communications device.

Paragraph 15. A method according to any of Paragraphs 1 to 14, wherein the OFDM symbols are transmitted with a reference sequence dependent on a first unique identifier of a first group of communications devices comprising at least the communications device and wherein the OFDM symbols which are transmitted having been shifted in frequency with respect to the frequency of the successive other OFDM symbols are each transmitted having been shifted in frequency by an amount dependent on a second unique identifier of a second group of communications devices comprising at least the communications device.

Paragraph 16. A method according to any of Paragraphs 1 to 15, wherein the reference sequence with which the OFDM symbols are transmitted is dependent on a coverage level of the communications device.

Paragraph 17. A method according to any of Paragraphs 1 to 16, wherein the OFDM symbols which are transmitted having been shifted in frequency with respect to the frequency of the successive other OFDM symbols are each transmitted having been shifted in frequency by an amount dependent on a coverage level of the communications device.

Paragraph 18. A method according to any of Paragraphs 1 to 17, wherein the reference sequence with which the OFDM symbols are transmitted is dependent on whether system information has changed since a previous downlink transmission was transmitted by the first infrastructure equipment to the communications device.

Paragraph 19. A method according to Paragraph 18, wherein the OFDM symbols which are transmitted having been shifted in frequency with respect to the frequency of the successive other OFDM symbols are each transmitted having been shifted in frequency by an amount dependent on which of a plurality of portions of the system information has changed since the previous downlink transmission was transmitted by the first infrastructure equipment to the communications device.

Paragraph 20. A method according to any of Paragraphs 1 to 19, wherein the OFDM symbols which are transmitted having been shifted in frequency with respect to the frequency of the successive other OFDM symbols are each transmitted having been shifted in frequency by an amount dependent on whether system information has changed since a previous downlink transmission was transmitted by the first infrastructure equipment to the communications device.

Paragraph 21. A method according to any of Paragraphs 1 to 20, wherein the reference sequence with which the OFDM symbols are transmitted is dependent on a tracking area of the communications device, the tracking area being a group comprising the first infrastructure equipment and one or more other infrastructure equipment from which the communications device is able to receive paging signals.

Paragraph 22. A method according to any of Paragraphs 1 to 21, wherein the wake-up signal is selected from a plurality of wake-up signals.

Paragraph 23. A method according to Paragraph 22, wherein the wake-up signal is selected dependent on a bandwidth capability of the communications device.

Paragraph 24. A method according to Paragraph 22 or 23, wherein each of the plurality of wake-up signals are transmitted with a unique reference sequence.

Paragraph 25. A method according to any of Paragraphs 1 to 24, wherein the wake-up signal comprises an information part, the information part comprising a plurality of OFDM symbols each being modulated with the reference sequence of a preceding preamble OFDM symbol and signalling information.

Paragraph 26. A method according to Paragraph 25, wherein the information part comprises information used by the communications device to decode the downlink message transmitted by the first infrastructure equipment.

Paragraph 27. A method according to Paragraph 25 or Paragraph 26, wherein each of the plurality of OFDM symbols of the information part carry a predetermined number of signalling bits which carry the signalling information.

Paragraph 28. A method according to Paragraph 27, wherein the predetermined number of signalling bits is three.

Paragraph 29. A method according to any of Paragraphs 25 to 28, wherein the method comprises
carrying out a cyclic shift of each of the OFDM symbols of the information part to indicate the signalling information, wherein a magnitude of the cyclic shift for each of the OFDM symbols is dependent on the information being signalled by the each of the OFDM symbols.

Paragraph 30. A method according to Paragraph 29, wherein the cyclic shift carried out on each of the OFDM symbols of the information part is encoded differently in relation to the cyclic shift carried out on neighbouring OFDM symbols of the each of the OFDM symbols of the information part.

Paragraph 31. A method according to any of Paragraphs 1 to 30, wherein the reference sequence comprises a dot product of a Zadoff-Chu sequence and a pseudo-random sequence.

Paragraph 32. A method according to Paragraph 31, wherein the frequency shifting of the one or more OFDM symbols comprises multiplying an inverse Fourier transform of the reference sequence with a complex exponential of an appropriate phase sequence Paragraph 33. A method according to any of Paragraphs 1 to 32, wherein the method comprises
prefixing each of the OFDM symbols forming one or both of the preamble of the wake-up signal and the information part of the wake-up signal with a cyclic prefix.

Paragraph 34. A method according to any of Paragraphs 1 to 33, wherein the first infrastructure equipment is an eNodeB, and the second infrastructure equipment is a mobility management entity.

Paragraph 35. An infrastructure equipment for use in a wireless communications system, the infrastructure equipment being a first infrastructure equipment, the wireless communications system comprising the first infrastructure equipment, a second infrastructure equipment and a communications device, wherein the first infrastructure equipment comprises controller circuitry and transceiver circuitry which are configured in combination:
to receive a command from the second infrastructure equipment comprising an indication that a downlink message for the communications device to decode should be transmitted by the first infrastructure equipment and that a wake-up signal should be transmitted by the first infrastructure equipment to the communications device in advance of transmitting the downlink message; and
to transmit the wake-up signal to the communications device in advance of transmitting the downlink message to provide the communications device with an indication that the downlink message for the communications device to decode will be transmitted, wherein the wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols.

Paragraph 36. Circuitry for an infrastructure equipment for use in a wireless communications system, the infrastructure equipment being a first infrastructure equipment, the wireless communications system comprising the first infrastructure equipment, a second infrastructure equipment and a communications device, wherein the first infrastructure equipment comprises controller circuitry and transceiver circuitry which are configured in combination:
to receive a command from the second infrastructure equipment comprising an indication that a downlink message for the communications device to decode should be transmitted by the first infrastructure equipment and that a wake-up signal should be transmitted by the first infrastructure equipment to the communications device in advance of transmitting the downlink message; and
to transmit the wake-up signal to the communications device in advance of transmitting the downlink message to provide the communications device with an indication that the downlink message for the communications device to decode will be transmitted, wherein the wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols.

Paragraph 37. A method of receiving data by a communications device from an infrastructure equipment of a wireless communications network, the method comprising
receiving signals including a wake-up signal transmitted from the infrastructure equipment, the wake-up signal indicating that the communications device will receive a downlink message from the infrastructure equipment for the communications device to decode, the wake-up signal comprising a wake-up signal preamble including a plurality of Orthogonal Frequency Division Multiplexed, OFDM, symbols each being combined with a reference sequence, and one or more of the OFDM symbols being shifted in frequency with respect to one or more of the other OFDM symbols,
generating digital signal samples of each of the plurality of OFDM symbols of the wake-up signal preamble,
correlating at least one of the OFDM symbols of the wake-up signal preamble with another of the OFDM symbols of the wake-up signal preamble to generate a correlation output signal, and
detecting the wake-up signal preamble from a peak of the correlation output signal.

Paragraph 38. A communications device for transmitting data to or receiving data from an infrastructure equipment of a wireless communications network, the communications device comprising
transmitter circuitry for transmitting signals representing data via a wireless access interface provided by the infrastructure equipment,
receiver circuitry for receiving signals representing data transmitted from the infrastructure equipment via the wireless access interface, and
controller circuitry for controlling the transmitter circuitry and the receiver circuitry to transmit the data to the infrastructure equipment and to receive the data from the infrastructure equipment, wherein the receiver circuitry includes
a front-end receiver configured to receive signals including a wake-up signal transmitted from the infrastructure equipment, the wake-up signal indicating that the communications device will receive a downlink message from the infrastructure equipment for the communications device to decode, the wake-up signal comprising a wake-up signal preamble including a plurality of Orthogonal Frequency Division Multiplexed, OFDM, symbols each being combined with a reference sequence, and one or more of the OFDM symbols being shifted in frequency with respect to one or more of the other OFDM symbols, and to generate digital signal samples of each of the plurality of OFDM symbols of the wake-up signal preamble, and
a wake-up signal detector comprising
a correlator configured to correlate at least one of the OFDM symbols of the wake-up signal preamble with another of the OFDM symbols of the wake-up signal preamble to generate a correlation output signal, and
a correlation peak detector configured to detect the wake-up signal preamble from a peak of the correlation output signal.

Paragraph 39. A communications device according to paragraph 38, wherein the wake-up signal preamble comprises at least one pair of the OFDM symbols, each of the OFDM symbols of the pair having been combined with the reference sequence and a first of the OFDM symbols of the pair being shifted in frequency shift with respect to a second of the OFDM symbol of the pair by a predetermined frequency shift, and the correlator of the wake-up signal detector is configured to correlate the first of the OFDM symbols of the pair with the second of the OFDM symbols of the pair to generate the correlation output signal.

Paragraph 40. A communications device according to paragraph 38, wherein the wake-up signal preamble comprises a plurality of pairs of the OFDM symbols, each of the OFDM symbols of the pair having been combined with the reference sequence and a first of the OFDM symbols of the pair being shifted in frequency shift with respect to a second of the OFDM symbol of the pair by a predetermined frequency shift, and the correlator of the wake-up signal detector is configured
for each of the pairs of OFDM symbols to correlate the first of the OFDM symbols of the pair with the second of the OFDM symbols of the pair to generate an intermediate output signal, and the correlation peak detector includes a combiner, which combines the intermediate output signal from the correlator for each of the pairs of OFDM symbols to form the correlation output signal.

Paragraph 41. A communications device according to paragraph 39 or 40, wherein the wake-up signal detector is configured to estimate an OFDM symbol synchronisation signal identifying a temporal period in which the received digital signal samples of a useful part of each of the OFDM symbols is present in the received signal, the OFDM symbol synchronisation signal being estimated from the peak of the correlation output signal and a number of the sub-carriers of each of the OFDM symbols, and the receiver circuitry comprises
a Fourier transform processor configured to receive the digital signal samples of the signal received from the front-end receiver and the OFDM symbol synchronisation signal and to convert the OFDM symbols of the wake-up signal into the frequency domain,
a reference sequence correlator configured to cross-correlate each of the frequency domain OFDM symbols of the wake-up signal preamble with a regenerated version of the reference sequence to form an output correlation signal, and
a reference sequence detector configured to detect the reference sequence from the output correlation signal received from the reference sequence detector.

Paragraph 42. A communications device according to paragraph 41, wherein the reference sequence detector is configured to generate, from a peak value of the output correlation signal received from the reference sequence detector, an estimate of at least one of a frequency offset of the received signal, and the frequency shift applied to one of the OFDM symbols of the wake-up signal preamble with respect to the other of the OFDM symbols of the wake-up signal preamble.

Paragraph 43. A communications device according to paragraph 42, wherein the frequency shift the frequency shift applied to one of the OFDM symbols of the wake-up signal preamble with respect to the other of the OFDM symbols of the wake-up signal preamble represents a first part of signalling information for the communications device, the controller circuitry being configured with the receiver circuitry to estimate the first part of the signalling data from the peak value of the output correlation signal received from the reference sequence detector by the reference sequence detector.

Paragraph 44. A communications device according to paragraphs 42 or 43, wherein the reference sequence is selected from one of a plurality of possible reference sequences, the selection of the reference sequence from the plurality of possible reference sequences representing a second part of the signalling information for the communications device, and the reference sequence correlator is configured to cross-correlate each of the frequency domain OFDM symbols of the wake-up signal preamble with a regenerated version of each of the possible the reference sequences to form a corresponding plurality of output correlation signals, and the reference sequence detector is configured to identify the reference sequence combined with the OFDM symbols of the wake-up signal from the plurality of possible reference sequences for identifying the first signalling information.

Paragraph 45. A communications device according to paragraph 44, wherein the reference sequence is formed from a combination of a pseudo-noise sequence and a Zadoff-Chu sequence, each of the pseudo-noise sequence and the Zadoff-Chu sequence being selected from one of a plurality of possible pseudo-noise sequences representing a third part of the signalling information and one of a plurality of possible Zadoff-Chu sequences representing a fourth part of the signalling information respectively, and to regenerate each of the possible versions of the reference sequences by combining each of the plurality of possible Zadoff-Chu sequences with each of the plurality of possible pseudo-noise sequences, and the controller circuitry is configured with the receiver circuitry to estimate the third and the fourth part of the signalling data from the peak value of the output correlation signal received from the reference sequence detector by the reference sequence detector.

Paragraph 46. A communications device according to any of paragraphs 38 to 45, wherein the wake-up signal comprises a signalling part transmitted after the preamble, the signalling part of the wake-up signal comprising a plurality of OFDM symbols each having been combined with the reference sequence and each having a cyclic shift applied to time domain samples of the OFDM symbol, the cyclic shift representing a fifth part of the signalling information, and the receiver circuitry comprises a wake-up signal signalling part detector, the wake-up signal signalling part detector comprising
  a signalling part correlator configured to receive the time domain received digital signal samples to form a frequency domain version of each of two successive OFDM symbols of the signalling part of the wake-up signal and to multiply respective frequency domain samples of one with the complex conjugate of the other to form an intermediate correlation result,
  a divider configured to divide the intermediate correlation result with respect combined samples of the reference sequence for the each of two successive OFDM symbols to form a second intermediate result,
  an inverse Fourier transformer configured to convert the second intermediate result into the time domain, and
  a peak detector configured to detect a peak value of the time domain version of the samples of the second intermediate result, the peak value providing an indication of the cyclic shift of the OFDM symbols of the signalling part of the wake-up signal for estimating the fifth part of the signalling information.

Paragraph 47. A communications device according to any of paragraphs 38 to 46, wherein the first part, the second part, the third part, the fourth part or the fifth part represent at least one of all of a cell identifier, a group identifier of the communications device, an indication that system information has changed, an indication of which signalling information has changed.

Paragraph 48. Circuitry for a communications device for transmitting data to or receiving data from an infrastructure equipment of a wireless communications network, the communications device comprising
  transmitter circuitry for transmitting signals representing data via a wireless access interface provided by the infrastructure equipment,
  receiver circuitry for receiving signals representing data transmitted from the infrastructure equipment via the wireless access interface, and
  controller circuitry for controlling the transmitter circuitry and the receiver circuitry to transmit the data to the infrastructure equipment and to receive the data from the infrastructure equipment, wherein the receiver circuitry includes
  a front-end receiver configured to receive signals including a wake-up signal transmitted from the infrastructure equipment, the wake-up signal indicating that the communications device will receive a downlink message from the infrastructure equipment for the communications device to decode, the wake-up signal comprising a wake-up signal preamble including a plurality of Orthogonal Frequency Division Multiplexed, OFDM, symbols each being combined with a reference sequence, and one or more of the OFDM symbols being shifted in frequency with respect to one or more of the other OFDM symbols, and to generate digital signal samples of each of the plurality of OFDM symbols of the wake-up signal preamble, and
  a wake-up signal detector comprising
  a correlator configured to correlate at least one of the OFDM symbols of the wake-up signal preamble with another of the OFDM symbols of the wake-up signal preamble to generate a correlation output signal, and
  a correlation peak detector configured to detect the wake-up signal preamble from a peak of the correlation output signal.

Paragraph 49. An infrastructure equipment for use in a wireless communications system, the infrastructure equipment being a second infrastructure equipment, the wireless communications system comprising a first infrastructure equipment, the second infrastructure equipment and a communications device, wherein the second infrastructure equipment comprises controller circuitry and transceiver circuitry which are configured in combination:
  to establish that a downlink message for the communications device to decode should be transmitted by the first infrastructure equipment;
  to determine that the first infrastructure equipment should transmit one of a plurality of wake-up signals to the communications device in advance of transmitting the downlink message to provide the communications device with an indication that the downlink message for the communications device to decode will be transmitted, wherein the wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols; and to transmit a command signal to the first infrastructure equipment comprising an indication that the first infrastructure equipment should transmit the wake-up signal to the communications device in advance of transmitting the downlink message to the communications device.

Paragraph 50. An infrastructure equipment according to Claim 49, wherein the command signal transmitted to the first infrastructure equipment comprises an indication of which one of the plurality of wake-up signals should be transmitted to the communications device.

Paragraph 51. An infrastructure equipment according to Claim 49, wherein the command signal transmitted to the first infrastructure equipment comprises an indication of a unique identifier of the communications device, the unique identifier of the communications device being associated with one of the plurality of wake-up signals.

Paragraph 52. An infrastructure equipment according to Claim 49, wherein the command signal transmitted to the first infrastructure equipment comprises an indication of a unique identifier of a group of communications devices comprising at least the communications device, the unique identifier of the group of communications devices being associated with one of the plurality of wake-up signals.

Paragraph 53. An infrastructure equipment according to any of Claims 49 to 52, wherein the first infrastructure equipment is an eNodeB, and the second infrastructure equipment is a mobility management entity.

Paragraph 54. A method of operating a second infrastructure equipment for use in a wireless communications system comprising a first infrastructure equipment, the second infrastructure equipment and a communications device, wherein the method comprises:

establishing that a downlink message for the communications device to decode should be transmitted by the first infrastructure equipment;

determining that the first infrastructure equipment should transmit one of a plurality of wake-up signals to the communications device in advance of transmitting the downlink message to provide the communications device with an indication that the downlink message for the communications device to decode will be transmitted, wherein the wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols; and transmitting a command signal to the first infrastructure equipment comprising an indication that the first infrastructure equipment should transmit the wake-up signal to the communications device in advance of transmitting the downlink message to the communications device.

Paragraph 55. Circuitry for an infrastructure equipment for use in a wireless communications system, the infrastructure equipment being a second infrastructure equipment, the wireless communications system comprising a first infrastructure equipment, the second infrastructure equipment and a communications device, wherein the second infrastructure equipment comprises controller circuitry and transceiver circuitry which are configured in combination:

to establish that a downlink message for the communications device to decode should be transmitted by the first infrastructure equipment;

to determine that the first infrastructure equipment should transmit one of a plurality of wake-up signals to the communications device in advance of transmitting the downlink message to provide the communications device with an indication that the downlink message for the communications device to decode will be transmitted, wherein the wake-up signal comprises a preamble formed by a plurality of Orthogonal Frequency Division Multiplexed, OFDM, symbols, each of the OFDM symbols being modulated with a reference sequence, and wherein one or more of the OFDM symbols are transmitted having been shifted in frequency with respect to successive others of the OFDM symbols; and to transmit a command signal to the first infrastructure equipment comprising an indication that the first infrastructure equipment should transmit the wake-up signal to the communications device in advance of transmitting the downlink message to the communications device. Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.

[2] RP-161901, "Revised work item proposal: Enhancements of NB-IoT", Huawei, HiSilicon, 3GPP TSG RAN Meeting #73, New Orleans, USA, Sep. 19-22, 2016.

[3] RP-170732, "New WID on Even further enhanced MTC for LTE," Ericsson, Qualcomm, 3GPP TSG RAN Meeting #75, Dubrovnik, Croatia, Mar. 6-9, 2017.

[4] RP-170852, "New WID on Further NB-IoT enhancements," Huawei, HiSilicon, Neul, 3GPP TSG RAN Meeting #75, Dubrovnik, Croatia, Mar. 6-9, 2017.

[5] Holma H. and Toskala A, "LTE for UMTS OFDMA and SC-FDMA based radio access", John Wiley and Sons, 2009.

[6] 3GPP TS 36.304 version 14.2.0 Release 14.

[7] 3GPP TS 36.321 version 13.5.0 Release 13.

[8] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.

[9] N. S. Maxloum, O. Edfors, "Performance Analysis and Energy Optimization of Wake-Up Receiver Schemes for Wireless Low-Power Applications," IEEE Transactions on Wireless Communications, December 2014.

[10] European patent application no. 17169577.8.

[11] US patent application, publication no. US 2017/026219 A1.

[12] US patent application, publication no. US 2017/026220 A1.

[13] US patent application, publication no. US 2017/026221 A1.

[14] R1-1708311, "Idle Mode Power Efficiency Reduction," Sierra Wireless, RAN1 #89.

What is claimed is:

1. A method of operating a first infrastructure equipment in a wireless communications system comprising the first infrastructure equipment, a second infrastructure equipment and a communications device, the method comprising:
receiving a command from the second infrastructure equipment comprising an indication that a downlink message for the communications device to decode should be transmitted by the first infrastructure equipment and that a wake-up signal should he transmitted by the first infrastructure equipment to the communications device in advance of transmitting the downlink message; and
transmitting the wake-up signal to the communications device in advance of transmitting the downlink message to provide the communications device with an indication that the downlink message for the communications device to decode will be transmitted, wherein
the wake-up signal comprises a preamble formed by a plurality of Orthogonal Frequency Division Multiplexed (OFDM) symbols, each of the OFDM symbols being associated with a unique symbol index and modulated with a reference sequence, and
one or more of the OFDM symbols, having an even symbol index, are transmitted having been shifted in frequency with respect to successive others of the OFDM symbols.

2. The method according to claim 1, wherein the OFDM symbols which are transmitted haying been shifted in frequency with respect to the frequency of the successive other OFDM symbols are each transmitted having been shifted in frequency by a same amount.

3. The method according to claim 1, wherein the OFDM symbols which are transmitted having been shifted in frequency with respect to the frequency of the successive other OFDM symbols are each transmitted having been shifted in frequency by an amount dependent on their symbol index.

4. The method according to claim 1, wherein the wake-up signal is transmitted in a substantially central portion of a narrow band channel of a wireless access interface of the wireless communications system.

5. The method according to claim 4, wherein the wake-up signal occupies sixty three subcarriers of the narrow band channel, wherein the narrow band channel is formed in a first bandwidth smaller than and contained within a host bandwidth in which the first infrastructure equipment is able to transmit and receive signals.

6. The method according to claim 4, wherein the method comprises modulating the OFDM symbol carried by the central sub-carrier of the portion of the narrow hand channel in which the wake-up signal is transmitted with zero.

7. The method according to claim 1, further comprising:
determining that the plurality of OFDM symbols form a plurality of pairs of OFDM symbols, each pair of OFDM symbols being formed of one of the OFDM symbols which are transmitted having been shifted in frequency with respect to the frequency of the successive other OFDM symbols and the respective successive other OFDM symbol; and
transmitting the same unique reference sequence in both OFDM symbols of each pair of OFDM symbols.

8. The method according to claim 7, wherein each of the OFDM symbols forming the preamble of the wake-up signal are associated with a unique symbol index, and each pair of OFDM symbols is associated with a unique pair index, and wherein the unique reference sequence of each pair of OFDM symbols is dependent on one or both of the symbol index and the pair index.

9. The method according to claim 8, wherein the unique reference sequence of each pair of OFDM symbols is a segment of a long reference sequence, a length of which is determined as the product of a total number of the plurality of the OFDM symbols of preamble of the wake-up signal and a number of subcarriers per OFDM symbol that are modulated with the reference sequence, wherein the segment of the long reference sequence is dependent on the symbol index.

10. The method according to claim 1, wherein the OFDM symbols are transmitted with a reference sequence dependent on a unique identifier of the communications device.

11. The method according to claim 1, wherein the OFDM symbols are transmitted with a reference sequence dependent on a unique identifier of a group of communications devices comprising at least the communications device.

12. The method according to claim 11, wherein the OFDM symbols which are transmitted having been shifted in frequency with respect to the frequency of the successive other OFDM symbols are each transmitted having been shifted in frequency by an amount dependent on a determination by the first infrastructure equipment as to whether to indicate to the communications device one of whether a downlink message for the communications device to decode is to be transmitted by the first infrastructure equipment or downlink message for the communications device to decode is to be transmitted.

13. The method according to claim 1, wherein the OFDM symbols which are transmitted having been shifted in frequency with respect to the frequency of the successive other OFDM symbols are each transmitted having been shifted in frequency by an amount dependent on a unique identifier of a group of communications devices comprising at least the communications device.

14. The method according to claim 1, wherein the OFDM symbols are transmitted with a reference sequence dependent on a first unique identifier of a first group of communications devices comprising at least the communications device and wherein the OFDM symbols which are transmitted having been shifted in frequency with respect to the frequency of the successive other OFDM symbols are each transmitted having been shifted in frequency by an amount dependent on a second unique identifier of a second group of communications devices comprising at least the communications device.

15. The method according to claim 1 wherein the reference sequence with which the OFDM symbols are transmitted is dependent on a coverage level of the communications device.

16. The method according to claim 1, wherein the OFDM symbols which are transmitted having been shifted in frequency with respect to the frequency of the successive other OFDM symbols are each transmitted having been shifted in frequency by an amount dependent on a coverage level of the communications device.

17. The method according to claim 1, wherein the reference sequence with which the OFDM symbols are transmitted is dependent on whether system information has changed since a previous downlink transmission was transmitted by the first infrastructure equipment to the communications device.

18. An infrastructure equipment for use in a wireless communications system, the infrastructure equipment being a first infrastructure equipment, the wireless communications system comprising the first infrastructure equipment, a second infrastructure equipment and a communications device, the first infrastructure equipment comprising:
transceiver circuitry: and
controller circuitry configured in combination with the transceiver circuitry to:
receive a command from the second infrastructure equipment comprising an indication that a downlink message for the communications device to decode should be transmitted by the first infrastructure equipment and that a wake-up signal should be transmitted by the first infrastructure equipment to the communications device in advance of transmitting the downlink message; and
transmit the wake-up signal to the communications device in advance of transmitting the downlink message to provide the communications device with an indication that the downlink message for the communications device to decode will be transmitted, wherein
the wake-up signal comprises a preamble formed by a plurality of Orthogonal Frequency Division Multiplexed (OFDM) symbols, each of the OFDM symbols being associated with a unique symbol index and modulated with a reference sequence, and
one or more of the OFDM symbols, having an even symbol index, are transmitted having been shifted in frequency with respect to successive others of the OFDM symbols.

19. A communications device for transmitting data to or receiving data from an infrastructure equipment of a wireless communications network, the communications device comprising:
transmitter circuitry for transmitting signals representing data via a wireless access interface provided by the infrastructure equipment;
receiver circuitry for receiving signals representing data transmitted from the infrastructure equipment via the wireless access interface; and
controller circuitry for controlling the transmitter circuitry and the receiver circuitry to transmit the data to the infrastructure equipment and to receive the data from the infrastructure equipment, wherein
the receiver circuity includes:
a front-end receiver configured to
receive signals including a wake-up signal transmitted from the infrastructure equipment, the wake-up signal indicating that the communications device will receive a downlink message from the infrastructure equipment for the communications device to decode, the wake-up signal comprising a wake-up signal preamble including a plurality of Orthogonal Frequency Division Multiplexed (OFDM) symbols each being associated with a unique symbol index and modulated with a reference sequence, and one or more of the OFDM symbols, having an even symbol index, being shifted in frequency with respect to one or more of the other OFDM symbols, and
generate digital signal samples of each of the plurality of OFDM symbols of the wake-up signal preamble; and
a wake-up signal detector comprising:
a correlator configured to correlate at least one of the OFDM symbols of the wake-up signal preamble with another of the OFDM symbols of the wake-up signal preamble to generate a correlation output signal; and
a correlation peak detector configured to detect the wake-up signal preamble from a peak of the correlation output signal.

* * * * *